United States Patent
Baldwin

(10) Patent No.: US 6,650,333 B1
(45) Date of Patent: Nov. 18, 2003

(54) MULTI-POOL TEXTURE MEMORY MANAGEMENT

(75) Inventor: David Robert Baldwin, Weybridge (GB)

(73) Assignee: 3Dlabs Inc., Ltd. (GB)

(*) Notice: Subject to any disclaimer, the term of this patent is extended or adjusted under 35 U.S.C. 154(b) by 617 days.

(21) Appl. No.: 09/591,229

(22) Filed: Jun. 9, 2000

Related U.S. Application Data

(60) Provisional application No. 60/138,350, filed on Jun. 9, 1999, provisional application No. 60/138,248, filed on Jun. 9, 1999, and provisional application No. 60/143,654, filed on Jul. 13, 1999.

(51) Int. Cl.[7] .............................................. G06T 11/40
(52) U.S. Cl. .................... 345/552; 345/531; 345/568; 345/582; 345/587; 711/203; 711/206
(58) Field of Search ................................ 345/531, 552, 345/568, 582, 587, 501, 503, 541–544, 557; 711/202–208

(56) References Cited

U.S. PATENT DOCUMENTS

| | | | |
|---|---|---|---|
| 5,548,709 A | | 8/1996 | Hannah et al. |
| 5,548,740 A | * | 8/1996 | Kiyohara .................... 345/543 |
| 5,611,064 A | | 3/1997 | Maund et al. |
| 5,696,927 A | * | 12/1997 | MacDonald et al. ........ 711/207 |
| 5,706,481 A | | 1/1998 | Hannah et al. |
| 5,760,783 A | * | 6/1998 | Migdal et al. .............. 345/587 |
| 5,828,382 A | | 10/1998 | Wilde |
| 5,831,640 A | | 11/1998 | Wang et al. |
| 5,842,015 A | | 11/1998 | Cunniff et al. |
| 5,880,737 A | | 3/1999 | Griffin et al. |
| 5,886,706 A | | 3/1999 | Alcorn et al. |
| 5,999,189 A | | 12/1999 | Kajiya et al. |
| 6,002,407 A | | 12/1999 | Fadden |
| 6,002,410 A | | 12/1999 | Battle |
| 6,011,565 A | | 1/2000 | Kuo et al. |
| 6,249,853 B1 | * | 6/2001 | Porterfield ................... 711/206 |
| 6,266,753 B1 | * | 7/2001 | Hicok et al. ................. 711/202 |
| 6,295,068 B1 | * | 9/2001 | Peddada et al. ............. 345/582 |

OTHER PUBLICATIONS

Cox et al., "Multi–Level Texture Caching for 3D Graphics Hardware," *Proceedings of the 25th International Symposium on Computer Architecture*, 1998.

Foley et al., Computer Graphics: Principles and Practice (2.ed. 1990, corr.1995), pp. 741–744.

Hakura and Gupta, "The Design and Analysis of a Cache Architecture for Texture Mapping," *Proceedings of the 24th International Symposium on Computer Architecture*, 1997.

Paul S. Heckbert, "Fundamentals of Texture Mapping and Image Warping," Thesis submitted to Dept. of EE and Computer Science, University of California, Berkeley, Jun. 17, 1994.

Heckbert, "Survey of Computer Graphics," *IEEE Computer Graphics*, Nov. 1986, pp. 56.

Igehy et al., "Prefetching in a Texture Cache Architecture", *IEEE*.

Blinn, Jim Blinn's Corner: "Dirty Pixels", *IEEE Computer Graphics and Applications Journal*, Jan. 1989, vol. 9, issue 4.

Blinn, Jim Blinn's Corner: "A Trip Down the Graphics Pipeline: Line Clipping", *IEEE Computer Graphics and Applications Journal*, Jan. 1991, vol. 11, issue 1.

Blinn, Jim Blinn's Corner: "A Trip Down the Graphics Pipeline: Pixel Coordinates", *IEEE Computer Graphics and Applications Journal*, Jul. 1991, vol. 11, issue 4.

(List continued on next page.)

Primary Examiner—Kee M. Tung
(74) Attorney, Agent, or Firm—Robert O. Groover, III

(57) ABSTRACT

A graphics accelerator which includes a dedicated virtual memory manager which manages at least some host memory, as well as dedicated graphics memory, and which manages memory during mipmapping using at least two separate pools of memory.

22 Claims, 14 Drawing Sheets

OTHER PUBLICATIONS

Blinn, Jim Blinn's Corner: "A Trip Down the Graphics Pipeline:Sub–Pixelic Particles" *IEEE Computer Graphics and Applications Journal*, Sep. 1991, vol. 11, issue 5.

Blinn, Jim Blinn's Corner: "A Trip Down the Graphics Pipeline: Grandpa, What Dopes Viewport Mean?", *IEEE Computer Graphics and Applications Journal*, Jan. 1992, vol. 12, iss. 1.

* cited by examiner

Linear or Patch64 Memory Layouts

32 bits per texel

| 120 | 112 | 104 | 96 | 88 | 80 | 72 | 64 | 56 | 48 | 40 | 32 | 24 | 16 | 8 | 0 |
|---|---|---|---|---|---|---|---|---|---|---|---|---|---|---|---|
| (3, 0) | | | | (2, 0) | | | | (1, 0) | | | | (0, 0) | | | |

16 bits per texel

| 120 | 112 | 104 | 96 | 88 | 80 | 72 | 64 | 56 | 48 | 40 | 32 | 24 | 16 | 8 | 0 |
|---|---|---|---|---|---|---|---|---|---|---|---|---|---|---|---|
| (7, 0) | | (6, 0) | | (5, 0) | | (4, 0) | | (3, 0) | | (2, 0) | | (1, 0) | | (0, 0) | |

8 bits per texel

| 120 | 112 | 104 | 96 | 88 | 80 | 72 | 64 | 56 | 48 | 40 | 32 | 24 | 16 | 8 | 0 |
|---|---|---|---|---|---|---|---|---|---|---|---|---|---|---|---|
| (15,0) | (14,0) | (13,0) | (12,0) | (11,0) | (10,0) | (9,0) | (8,0) | (7,0) | (6,0) | (5,0) | (4,0) | (3,0) | (2,0) | (1,0) | (0,0) |

*FIG. 7A*

Patch32_2 or Patch2 Memory Layouts

32 bits per texel

| 120 | 112 | 104 | 96 | 88 | 80 | 72 | 64 | 56 | 48 | 40 | 32 | 24 | 16 | 8 | 0 |
|---|---|---|---|---|---|---|---|---|---|---|---|---|---|---|---|
| (1, 1) | | | | (0, 1) | | | | (1, 0) | | | | (0, 0) | | | |

16 bits per texel

| 120 | 112 | 104 | 96 | 88 | 80 | 72 | 64 | 56 | 48 | 40 | 32 | 24 | 16 | 8 | 0 |
|---|---|---|---|---|---|---|---|---|---|---|---|---|---|---|---|
| (3, 1) | | (2, 1) | | (3, 0) | | (2, 0) | | (1, 1) | | (0, 1) | | (1, 0) | | (0, 0) | |

8 bits per texel

| 120 | 112 | 104 | 96 | 88 | 80 | 72 | 64 | 56 | 48 | 40 | 32 | 24 | 16 | 8 | 0 |
|---|---|---|---|---|---|---|---|---|---|---|---|---|---|---|---|
| (7,1) | (6,1) | (7,0) | (6,0) | (5,1) | (4,1) | (5,0) | (4,0) | (3,1) | (2,1) | (3,0) | (2,0) | (1,1) | (0,1) | (1,0) | (0,0) |

*FIG. 7B*

MULTI-POOL TEXTURE MEMORY MANAGEMENT

Continuation of prior application Ser. No. 60/138,350 filed Jun. 9, 1999, Ser. No. 60/138,248 filed Jun. 9, 1999, and Ser. No. 60/143,654 Filed Jul. 13, 1999.

BACKGROUND AND SUMMARY OF THE INVENTION

The present application relates to computer graphics rendering systems and methods, and particularly to handling of texture data used by rendering accelerators for 3D graphics.

Background
3D Computer Graphics

One of the driving features in the performance of most single-user computers is computer graphics. This is particularly important in computer games and workstations, but is generally very important across the personal computer market.

For some years the most critical area of graphics development has been in three-dimensional ("3D") graphics. The peculiar demands of 3D graphics are driven by the need to present a realistic view, on a computer monitor, of a three-dimensional scene. The pattern written onto the two-dimensional screen must therefore be derived from the three-dimensional geometries in such a way that the user can easily "see" the three-dimensional scene (as if the screen were merely a window into a real three-dimensional scene). This requires extensive computation to obtain the correct image for display, taking account of surface textures, lighting, shadowing, and other characteristics.

The starting point (for the aspects of computer graphics considered in the present application) is a three-dimensional scene, with specified viewpoint and lighting (etc.). The elements of a 3D scene are normally defined by sets of polygons (typically triangles), each having attributes such as color, reflectivity, and spatial location. (For example, a walking human, at a given instant, might be translated into a few hundred triangles which map out the surface of the human's body.) Textures are "applied" onto the polygons, to provide detail in the scene. (For example, a flat carpeted floor will look far more realistic if a simple repeating texture pattern is applied onto it.) Designers use specialized modelling software tools, such as 3D Studio, to build textured polygonal models.

The 3D graphics pipeline consists of two major stages, or subsystems, referred to as geometry and rendering. The geometry stage is responsible for managing all polygon activities and for converting three-dimensional spatial data into a two-dimensional representation of the viewed scene, with properly-transformed polygons. The polygons in the three-dimensional scene, with their applied textures, must then be transformed to obtain their correct appearance from the viewpoint of the moment; this transformation requires calculation of lighting (and apparent brightness), foreshortening, obstruction, etc.

However, even after these transformations and extensive calculations have been done, there is still a large amount of data manipulation to be done: the correct values for EACH PIXEL of the transformed polygons must be derived from the two-dimensional representation. (This requires not only interpolation of pixel values within a polygon, but also correct application of properly oriented texture maps.) The rendering stage is responsible for these activities: it "renders" the two-dimensional data from the geometry stage to produce correct values for all pixels of each frame of the image sequence.

The most challenging 3D graphics applications are dynamic rather than static. In addition to changing objects in the scene, many applications also seek to convey an illusion of movement by changing the scene in response to the user's input. Whenever a change in the orientation or position of the camera is desired, every object in a scene must be recalculated relative to the new view. As can be imagined, a fast-paced game needing to maintain a high frame rate will require many calculations and many memory accesses.

FIG. 2 shows a high-level overview of the processes performed in the overall 3D graphics pipeline. However, this is a very general overview, which ignores the crucial issues of what hardware performs which operations.

Hardware Acceleration

Since rendering is a computationally intensive operation, numerous designs have offloaded it from the main CPU. An example of this is the GLINT chip described below.

Texturing

There are different ways to add complexity to a 3D scene. Creating more and more detailed models, consisting of a greater number of polygons, is one way to add visual interest to a scene. However, adding polygons necessitates paying the price of having to manipulate more geometry. 3D systems have what is known as a "polygon budget," an approximate number of polygons that can be manipulated without unacceptable performance degradation. In general, fewer polygons yield higher frame rates.

The visual appeal of computer graphics rendering is greatly enhanced by the use of "textures." A texture is a two-dimensional image which is mapped into the data to be rendered. Textures provide a very efficient way to generate the level of minor surface detail which makes synthetic images realistic, without requiring transfer of immense amounts of data. Texture patterns provide realistic detail at the sub-polygon level, so the higher-level tasks of polygon-processing are not overloaded. See Foley et al., Computer Graphics: Principles and Practice (2.ed. 1990, corr.1995), especially at pages 741–744; Paul S. Heckbert, "Fundamentals of Texture Mapping and Image Warping," Thesis submitted to Dept. of EE and Computer Science, University of California, Berkeley, Jun. 17, 1994; Heckbert, "Survey of Computer Graphics," IEEE Computer Graphics, November 1986, pp. 56; all of which are hereby incorporated by reference. Game programmers have also found that texture mapping is generally a very efficient way to achieve very dynamic images without requiring a hugely increased memory bandwidth for data handling.

A typical graphics system reads data from a texture map, processes it, and writes color data to display memory. The processing may include mipmap filtering which requires access to several maps. The texture map need not be limited to colors, but can hold other information that can be applied to a surface to affect its appearance; this could include height perturbation to give the effect of roughness. The individual elements of a texture map are called "texels."

Awkward side-effects of texture mapping occur unless the renderer can apply texture maps with correct perspective. Perspective-corrected texture mapping involves an algorithm that translates "texels" (pixels from the bitmap texture image) into display pixels in accordance with the spatial orientation of the surface. Since the surfaces are transformed (by the host or geometry engine) to produce a 2D view, the textures will need to be similarly transformed by a linear transform (normally projective or "affine"). (In conventional terminology, the coordinates of the object surface, i.e. the primitive being rendered, are referred to as an (s,t) coordinate space, and the map of the stored texture is referred to a (u,v) coordinate space.) The transformation in the resulting mapping means that a horizontal line in the (x,y) display space is very likely to correspond to a slanted line in the (u,v) space of the texture map, and hence many additional reads will occur, due to the texturing operation, as rendering walks along a horizontal line of pixels.

Data and Memory Management

Due to the extremely high data rates required at the end of the rendering pipeline, many features of computer architecture take on new complexities in the context of computer graphics (and especially in the area of texture management).

Virtual Memory Management

One of the basic tools of computer architecture is "virtual" memory. This is a technique which allows application software to use a very large range of memory addresses, without knowing how much physical memory is actually present on the computer, nor how the virtual addresses correspond to the physical addresses which are actually used to address the physical memory chips (or other memory devices) over a bus.

Some further discussion of Virtual memory management can be found in Hennessy & Patterson, Computer Architecture: a Quantititive Approach (2.ed. 1996); Hwang and Briggs, Computer Architecture and Parallel Processing (1984); Subieta, Object-based virtual memory for PCs (1990); Carr, Virtual memory management (1984); Lau, Performance improvement of virtual memory systems (1982); and Loshin, Efficient Memory Programming (1998); all of which are hereby incorporated by reference. An excellent hypertext tutorial is found in the Web pages which start at http://cne.gmu.edu/Modules/VM/, and this hypertext tutorial is also hereby incorporated by reference. Another useful online resource is found at http://www.harlequin.com/mm/reference/faq.html, and this too is hereby incorporated by reference. Much current work can be found in the annual proceedings of the ACM International Symposium on Memory Management (ISMM), which are all hereby incorporated by reference.

Texture Caching

A recurrent problem with texture mapping is the amount of data each texture map contains. If it is of high quality and detail it may require a substantial amount of storage space. The size of texture maps may be increased if mipmap filtering is supported. Simply moving textures from one physical storage location to another may be a time consuming operation. In a normal graphics system the time taken to transfer a texture from disk or system memory to the graphics system may be significantly more than the time taken to apply the texture. Network applications, in which the application and graphics system are on separate machines linked by a low bandwidth connection, aggravate this problem. Improvements can be made by caching the texture locally in the graphics system, but the time taken to transfer it just once may be prohibitive.

Caching would be particularly desirable for texture management in 3D graphics. The desirability for some form of texture caching is easily demonstrated by a simple calculation. If the target performance is to do trilinear filtering in a single cycle, then 8 texels per output fragment are required. If each texel is in true color (i.e. 32 bits per pixel), then the texture read bandwidth is 32 bytes per cycle, or (assuming a 100 MHz bus) 3.2 GB/s. With clever cache design this can be reduced to 1.25 texels read per pixel (assuming the texture maps are very much larger than will fit into the cache), i.e. 500 MB/s. (Note the trivial case where the texture maps fit into cache and are already loaded is an easy one to solve, but isn't useful with real world scenarios.) Caching texture maps is not a new idea of itself, but previous implementations leave room for improvement.

Background

DRAM Speed Improvements under Collocated Access

The access speed of DRAMs has generally not improved as fast as many system designers would like. One technique that has repeatedly surfaced, in various forms, is to provide improved access speeds for successive accesses to adjacent physical memory locations. In general, memory accesses often show some degree of spatial correlation, and an architecture which provides speed improvements for such accesses can be useful. (The accesses need not be strictly sequential; as long as successive accesses all fall within some small range of address values, they can be regarded as "collocated." If this range is small enough to fall within a range small enough for the memory architecture to economize on setup times, some net improvement can be achieved. For example, in fast page mode DRAM the row address setup time is eliminatted for any access which uses the same row address as the preceding access. (More precisely, a row access strobe (RAS\) signal is held constantly active while the column access strobe (CAS\) signal strobes in column addresses, to read successive cells in a single row.) Further developments of this have appeared, for example, in burst EDO DRAMs.

Of course other improvements have continued; one active area in the 1990s was synchronization between memory and processor, e.g. in the SDRAM architectures. SDRAMs also typically include two or four banks of memory in each chip, as discussed below. Synchronization has also been introduced into specialty graphics memory in the SGRAM architecture, which includes block write functions for faster fill in graphics applications.

Multi-Pool Texture Memory Management

As noted above, virtual memory architectures have long been used in general-purpose computers. However, there turn out to be some surprising difficulties in using this idea in computer graphics (especially for texture memory). The present application discloses several innovations related to virtualization and caching of texture memory.

Notable (and separately innovative) features of the virtual texture mapping architecture described in the present application include at least the following: A single chip solution is provided; Two or three levels of texture memory hierarchy are supported; The page faulting is all done in hardware with no host intervention; The texture memory management function can be used to manage texture storage in the host memory in addition to the texture storage in our normal texture memory; Multiple memory pools are supported; and multiple rasterizers can be supported capable.

The access times to the memory allocated (in level 1) for the working set are not all the same. For example successive accesses to the different DRAM pages from the same bank of memory will incur page break costs up to 10 times the cost of an access which doesn't cause a page break to occur. When mip mapping, it is very common for two texture maps to be accessed simultaneously. If both texture maps (which are just adjacent levels in the mip map set) are in the same bank, but in different DRAM pages (as is very likely except for the very lowest resolution maps) then a significant number of page breaks will occur. The hardware will try to make the best of a bad map layout by grouping accesses to each map together so the page break costs can be amortised over more texels reads, but the ideal solution is to lay the textures out so that adjacent map levels are in different banks of memory. When this can be done there are no page breaks when interleaving accesses to both maps.

The virtual texture hardware can manage up to 4 pools of memory and will allocate a faulting texture page to the appropriate memory pool under control of the MemoryPool bits in the logical page table. An least-recently-used list of pages (used when deciding which page can be replaced) is maintained for each memory pool.

Thus a benefit is derived from avoiding DRAM page breaks (i.e. trying to keep the DRAMs in their page mode).

There is also another important benefit from this idea in two ways. If the texture map is mipmapped: any significant texture map will be far greater than typical cache size. Moreover, trilinear filtering implies sequential accesses in two localized areas: so with two FIFOs, correlated accesses can be grouped to optimize DRAM paging; however, this increases latency, which itself meets limits. Since an SDRAM chip is internally divided into banks (2 or 4, preferably 4), the user can keep open as many as four pages per bank. This permits the use of, e.g., two banks for textures, one for Z, one for color. More precisely, this can be imaged as: even levels in bank zero, odd in bank one.

Now if memory allocation is handled in software, it will be cognizant of this; but since memory allocation is done in hardware, the hardware has to get the information. Each page of texture is assigned to a pool, with a strict relation forced, using a 2-bit field in the page table. (A pool is just a collection of pages to which some specific relation is assigned. The relation is hidden in how the allocation tables are built; at the start different linked lists are run for each pool.)

Note that odd and even levels are not identical in size: the highest resolution is level 0, so odd levels are smaller on average than their even counterparts.

The extra two pools are useful, e.g. for lighting in QUAKE, etc. Programmers are allowed to edit textures (using e.g. feature texsubimage in an OpenGL space) by editing the corresponding bit in host memory and telling hardware to invalidate its references to the edited space— see the section on "Editing Texture Maps" in the Detailed Description.

However, if one is editing textures at a high rate (e.g. with dynamic lighting in a game scenario, with a rocket roaring down a corridor), this requires burdensome synching (between host-memory updates and whatever is going on on the card); the question is how to avoid thrashing and synching. A reload command will use the same memory if the data is already present, but it isn't known whether the data is already present.

To avoid this problem, when it is detected that a texture map is to be used for the very first time, those pages are locked down into the working set by moving these pages into one of the two spare pools. Because they are in their own special pool, they will never get thrown out. Synching is only an issue if the location of the data is unknown, but if it is known that it is on card it can be solved with a reload.

For additional information, see the section on "Memory Pools" in the Detailed Description. Note also FIG. 10: the upper part of this diagram shows the organization for texture virtual memory management, and the bottom part shows the organization for texture caching.

BRIEF DESCRIPTION OF THE DRAWING

The disclosed inventions will be described with reference to the accompanying drawings, which show important sample embodiments of the invention and which are incorporated in the specification hereof by reference, wherein:

FIGS. 7A and 7B show layouts in memory for the various supported formats.

DETAILED DESCRIPTION OF THE PREFERRED EMBODIMENTS

The numerous innovative teachings of the present application will be described with particular reference to the presently preferred embodiment (by way of example, and not of limitation).

The following pages give details of a sample embodiment of the preferred rendering accelerator chip (referred to as "P3" in the following document, although not all details may apply to every chip revision marketed as P3). Particular attention will be paid to the Texture Read Unit of this chip, where many of the disclosed inventions are implemented. Commonly-owned U.S. application Ser. Nos. 09/322,828, 09/280,250, and 09/266,052 provide various other details of the contexts within which the claimed inventions are most preferably implemented, and are all incorporated herein by reference. The present application is one of nine applications filed simultaneously, which are all contemplated to be implemented together in a common system. The other applications are attorney's docket numbers TD-151 through TD-159, and all are hereby incorporated by reference. Also incorporated by reference are commonly owned U.S. provisional priority application 60/138,350 and 60/138,248, both filed Jun. 9, 1999, and provisional application Nos. 60/143,826, 60/143, 712, 60/143,661, 60/143,655, 60/143,822, 60/143,825, 60/143,654, 60/143,660, 60/143,650, all filed on Jul. 13, 1999.

The preferred embodiments presented are implemented in a Permedia 3™ (P3) graphics core produced by 3D Labs, Inc. The overall architecture of the graphics core is best viewed using the software paradigm of a message passing system. In this system all the processing units are connected in a long pipeline with communication with the adjacent units being done through message passing. Between each unit there is a small amount of buffering, the size being specific to the local communications requirements and speed of the two units. The message rate is variable and depends on the rendering mode. The messages do not propagate through the system at a fixed rate typical of a more traditional pipeline system. If the receiving block cannot accept a message, because its input buffer is full, then the sending block stalls until space is available. A more expensive version of this chip is also contemplated, and will be referred to as "RX" in the following description; the RX has the same functionality as the P3 chip, but has more memory etc. Both chips, and other members of the 3Dlabs family of pipelined rendering accelerators, may also be referred to generically as "GLINT" chips.

Figure 1:
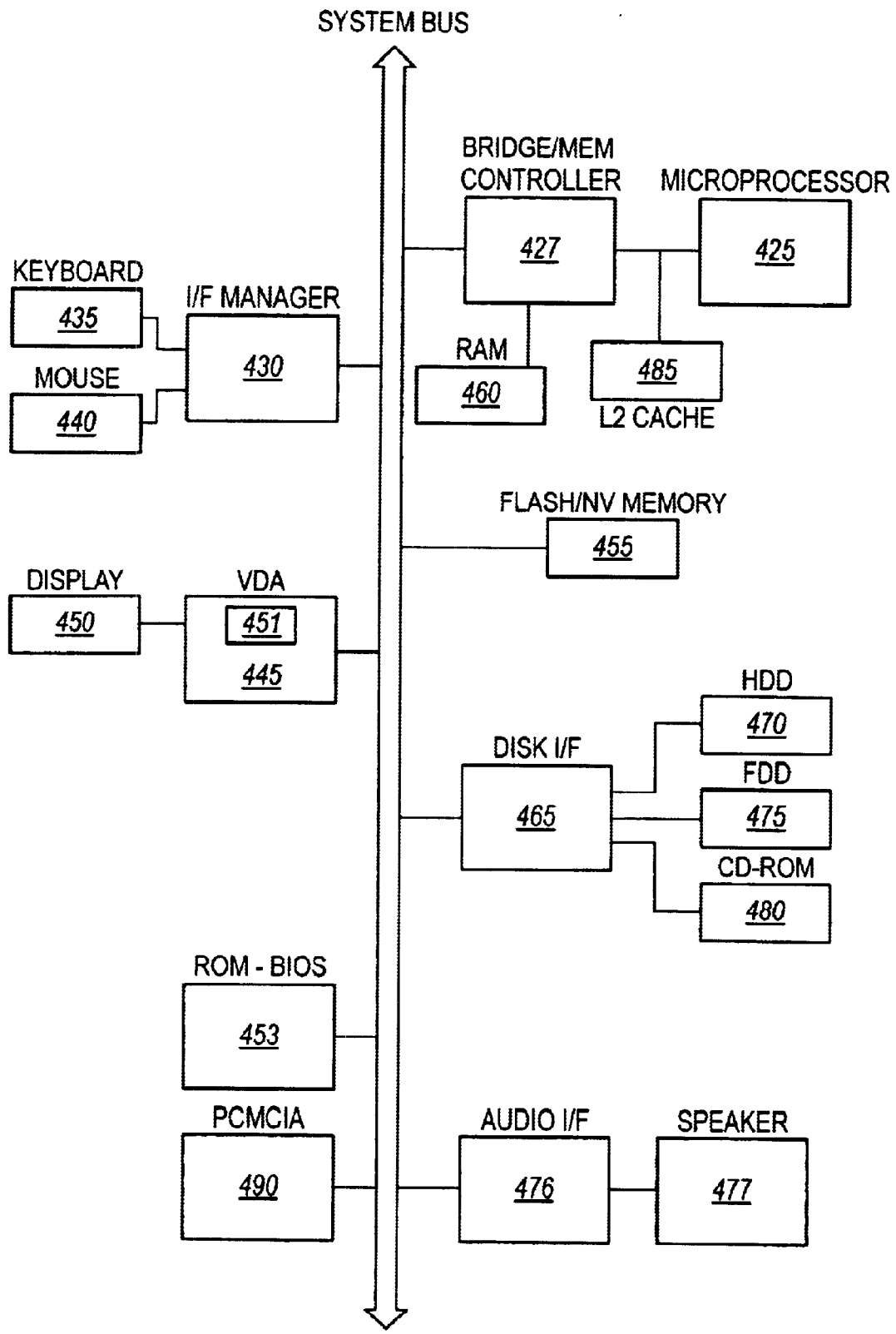
FIG. 1 is an overview of a computer system, with a rendering subsystem, which incorporates the disclosed graphics memory management ideas.
Figure 2:
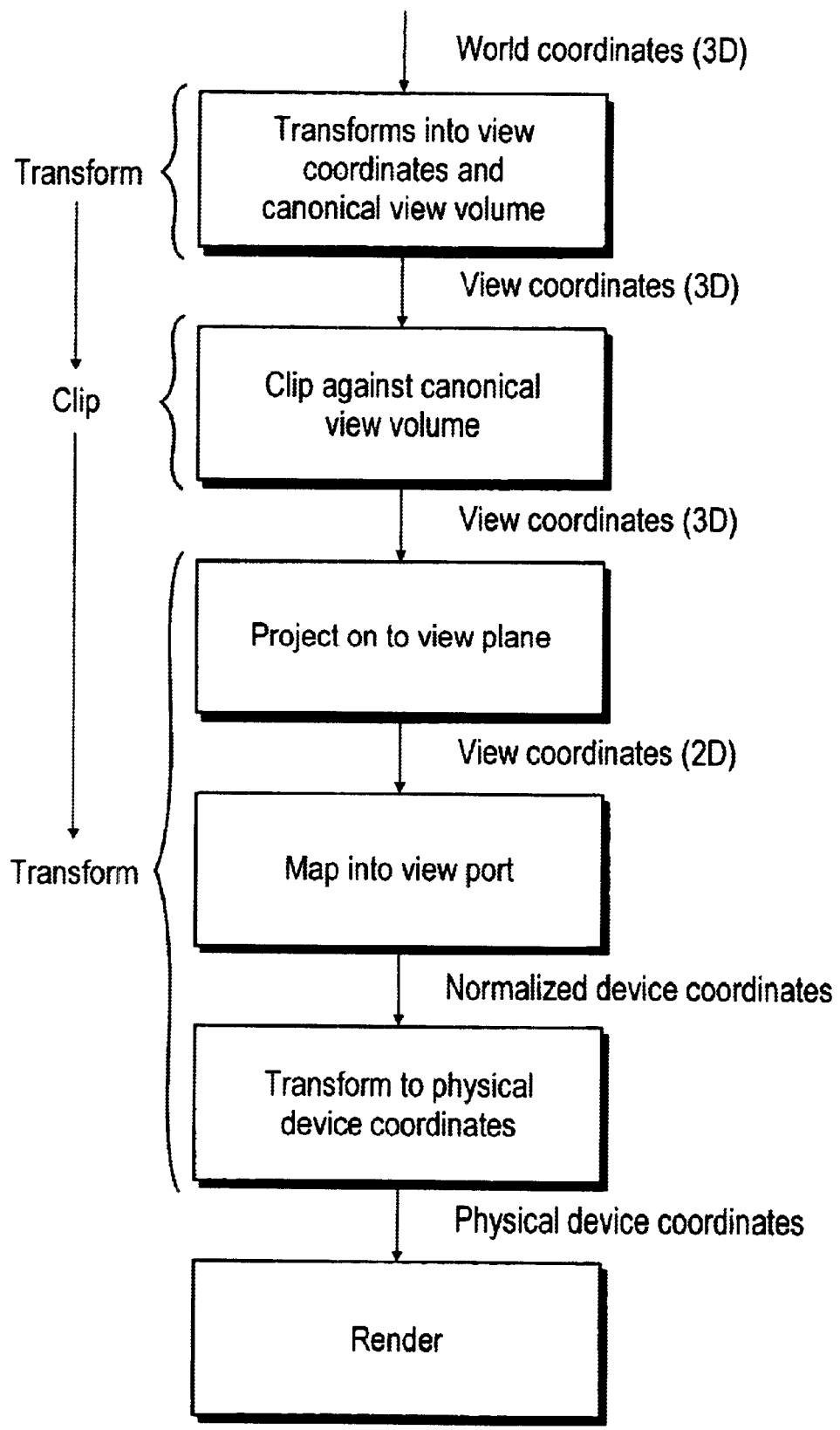
FIG. 2 is a very high-level view of other processes performed in a 3D graphics computer system.

FIG. 1 shows a block diagram of a sample computer system context; however, the disclosed techniques can advantageously be incorporated in any number of graphics systems.

Figure 3:
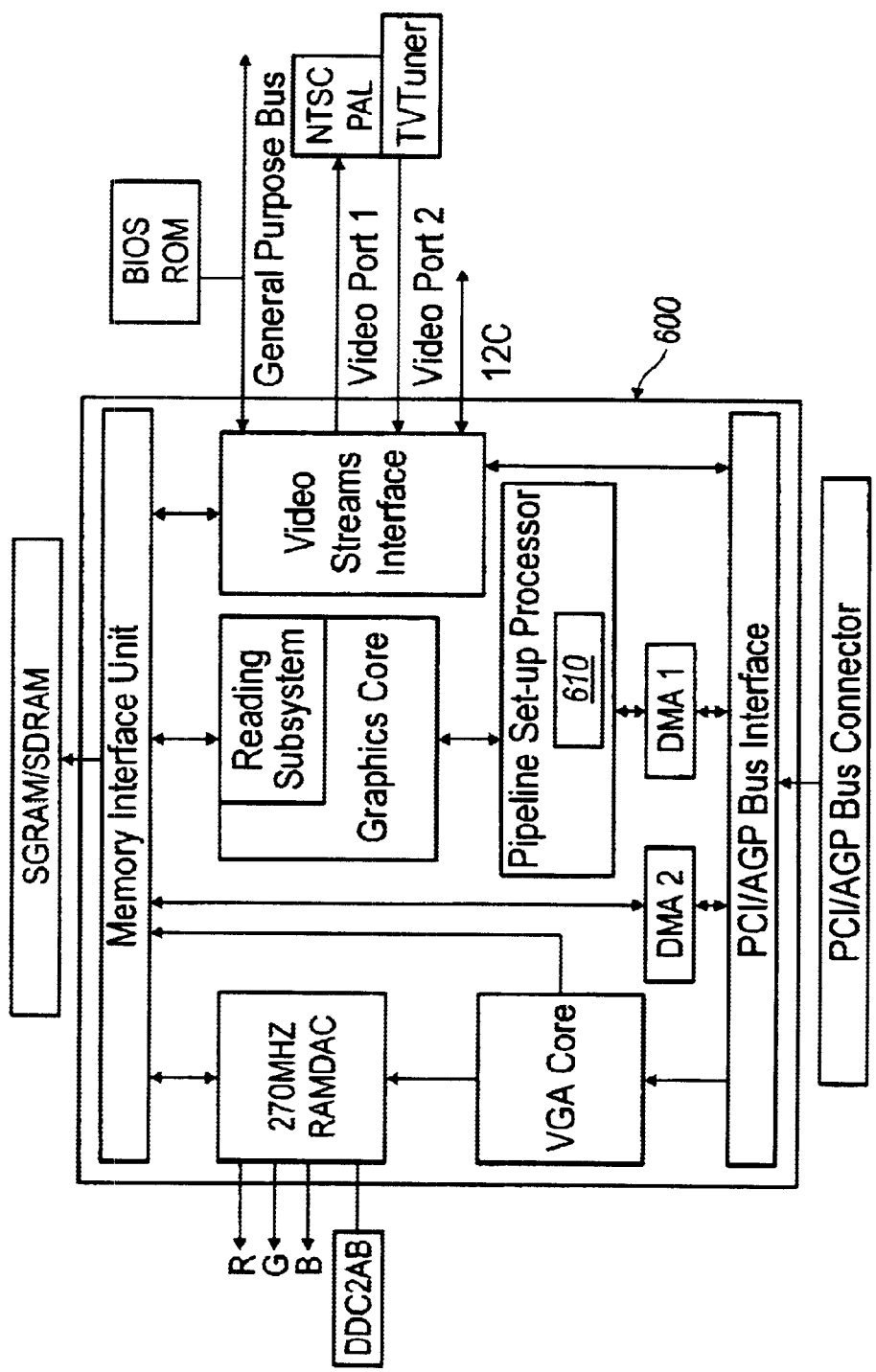
FIG. 3 shows a block diagram of a 3D graphics accelerator subsystem.

FIG. 3 shows a block diagram of a graphics processor which can incorporate the disclosed embodiments of the read-modify-write solutions in its rendering subsystem. A sample board incorporating the P3™ graphics processor may include these elements:

the P3™ graphics core itself;

a PCI/AGP interface;

DMA controllers for PCI/AGP interface to the graphics core and memory;

SGRAM/SDRAM, to which the chip has read-write access through its frame buffer (FB) and local buffer (LB) ports;

a RAMDAC, which provides analog color values in accordance with the color values read out from the SGRAM/SDRAM; and a video stream interface for output and display connectivity.

Various claimed features, and/or features of particular interest, are found in the Texture Read Unit, which will now be described in detail.

Texture Read Unit Description

The Texture Read Unit's main job is to manage the primary texture cache (the data part is in the Texture Filter Unit) and load texel data into it, preferably in advance of when it is needed. The primary cache can be used as one large cache or as two smaller (half size) caches depending on the type of texture mapping being done. The single large cache is an optimization and allows higher cache hits when the texture map is large or the polygon is large and a single bilinear texture is used.

When texture needs to be loaded the address(es) are calculated for the texel data. These addresses may be physical addresses in which case the address is issued to the Memory Controller and some time later the data returned. Alternatively the address may be a logical one so the following steps are taken to resolve (or translate) it:

The logical address (really just the page part) is looked up in the Translation Look aside Buffer (TLB) and if present the corresponding physical address is issued to the Memory Controller.

The address translation may fail in the TLB so the page table in memory is accessed and if the page is resident the physical address is looked up, the TLB updated and the physical address is issued to the Memory Controller.

The page may not be resident in the working set so the page is read from host memory (or the host asked for it via an interrupt) and when it has been loaded the newly updated page table is read, the TLB updated and the physical address is issued to the Memory Controller. The page may be marked as a host texture in which case the address mapping is done, but the texture is not downloaded.

The unit is controlled by the TextureReadMode0 and TextureReadMode1 messages for texture 0 and texture 1 respectively. Both messages have an identical format, however some modes are mutually exclusive as there are not enough resources to allow all combinations. The supported combinations are:

One nearest or linear filtered texture using both halves of the cache to achieve higher cache hit rates on larger texture maps or polygons.

Any two independent nearest or linear filtered textures, one per half of the cache.

One automatically (or per pixel) mip mapped texture (always texture 0) using both halves of the cache to store alternate levels of the mip map.

One 3D texture map using both halves of the cache to store alternate slices of the 3D volume.

Two independent mip mapped textures where the minification filters only use texels from one level at a time (i.e. the filter are NearestMipNearest or LinearMipNearest). Each texture uses half the cache.

There are no interlocks to prevent the user selecting a non-supported combination and in this case the mode settings in TextureReadMode0 take priority.

Performance

When the unit is disabled the active steps should take one cycle as should all other messages irrespective of the enabled state of the unit.

When the unit is enabled the target throughput is one active step message every 1 cycles for all mode combinations providing all required texels are in the primary cache. The first cache miss in each bank requiring a physical memory read or logical memory read with a TLB hit adds zero cycles but subsequent ones can take an extra cycle each. (The nth cache miss for a step may be satisfied by an earlier cache load on the same step so does not count for extra time.) The zero extra cycles case can not be sustained as the actual address generation and reading will take two cycles, however the flow of fragments into the M FIFO should not be disrupted until the AG FIFOs blocks.

If there is a TLB miss, a page miss (i.e. not resident) or the cache is loaded from memory then the memory access time should be the limiting factor.

The presence of other messages ignored by this unit but mixed in with the active step messages should not cause any stalls in the pipeline with a consequence loss of performance while the pipeline empties and fills up again.

The presence of messages which load up registers (mode or address, for example) in this unit can wait for the unit to become idle as these are global and shared by all sub units (which may be operating on queued work).

Texture Memory Layouts

The Layout field in the-TextureMapWidth registers selects how the texture data is to be laid out in memory for each mip map level. The options are:

Linear. Here the rows are stored one after another in memory. This is typically used for small texture maps (less than 32×32×32 bpp which fit into one page) and are always accessed along a row. This matches up with most 2D use of texture maps for font, icon and stipple pattern storage. Video data will also fall into this category.

Patch64. In this layout the pixel data is arranged into 64×16 patches for 32 bpp, 128×16 for 16 bpp and 256×16 for 8 bpp. This is the preferred layout for the color buffer (desktop) so will only be used when the texture units need to operate on this data directly, for example to stretch blit a window.

Patch32_2. The texture data is arranged into 32×32 patches, but also patched to a finer level so that one read always returns a 2×2 block of texel data (for 32 bit texels), a 2×4 block for 16 bit texels or a 2×8 block for 8 bit texels.

Patch2. The texture data is arranged into 2×2 patches. This is used for texture maps where the total number of texels is less than 1K so it all fits into a page.

Linear or Patch64 texture formats can choose between top left and bottom left origins, but the texture map must start on the natural boundary for the texel size. For 8 bit texels this is on a byte boundary, for 16 bit texels this is on a 2 byte boundary and for 32 bit texels this is on a 4 byte boundary.

The preferred layout for texture maps (1D or 2D) for use by 3D rendering is Patch32_2 or Patch2 as this gives the minimum number of reads for an arbitrary orientation of the map, but for this to work the following rules must be followed:

The texture maps are stored with the top left corner as the origin, i.e. texels at increasing u and/or v coordinates are at increasing memory addresses.

The texture map must start on the natural patch boundary for the texel size. For 8 bit texels this is on a 4 byte boundary, for 16 bit texels this is on a 8 byte boundary and for 32 bit texels this is on a 16 byte boundary.

Patch32_2 layout only make sense when the width of the texture map is greater than the patch width (128 bytes). Using Patch32_2 on texture maps which are less than 128 bytes wide will just fragment the texture map within the patch. This clearly wastes storage and may increase the number of page breaks. When the Texture Read Unit detects that the width of a texture map is less than or equal to 128 bytes it will change the layout from Patch32_2 to Patch2 automatically. This allows mip maps to be Patch32_2 for the high resolution levels and Patch2 for the low resolution levels.

It is the software's responsibility to set the layout to Patch32_2 or Patch2 as appropriate when the texture map is downloaded. The hardware will write the texel data into the correct place but not switch layouts automatically.

The minimum width and height of a texture map (in any layout) is 2 texels. If the width and/or height of a texture map is 1 (such as the lowest resolution map in a set of mip maps) then the texels must be replicated to expand the offending dimension(s) to 2 texels. (This is necessary as the bilinear index calculations will select set i0=0 and i1=0 with the interpolation coefficient set to combine some fraction of texel 0 with texel 0, thus yielding texel 0. The Filter Unit cannot be configured to do this, but can achieve the same effect if the texel is repeated.) If a 1×1 texture map has a border then the 3×3 map is stored as a 4×4 map as shown:

| b0 | b1 | b2 |
| b3 | t0 | b4 |
| b5 | b6 | b7 |

| b0 | b1 | b2 | b2 |
| b0 | b1 | b2 | b2 |
| b3 | t0 | b4 | b4 |
| b5 | b6 | b7 | b7 |

All the preceding comments on texture map layout for 1D and 2D texture maps apply to the individual slices of a 3D texture map. The base address of slice 0 is given in the TextureBaseAddr0 register and the offset (in texels) between slices is given in TextureMapSize register. The TextureMapSize should be set to a value greater than or equal to the product of the width and height for a slice.

Address Calculation

The type of texture is checked and if it is a 3D texture map the base address is set from TextureBaseAddr[0] register, the layout and texel size are taken from TextureReadMode0 register and the width from TextureMapWidth0.

If the texture is not a 3D texture map then the layout, texel size and width parameters are taken from the appropriate texture registers (these registers should be loaded the same for per pixel mip mapping). The width is divided by 2 to the (map level), so the correct mip map width is used. Note the width does not have to be a power of 2, so the divide may have a remainder (which is ignored) so will fail past some map level. This is not a problem as mip maps will always be a power of two in size and non mip maps will always have a map level of 0. The base address is read from one of the 16 base address registers. The actual one used depends on the map level, the map base level and map max level associated with this texture as given by:

offset into base registers=min(texture map level+map base level, max map level)

so the allocation of the base registers between the two possible textures is up to software.

The maximum width is 4095, but the minimum width depends on the layout as the Patch2 and Patch32_2 have some minimum requirements. If the mip mapping forces the width below these minimum requirements then the width is forced to be the minimum allowed for the texel size. The minimum texel widths are 8, 4 and 2 for 8, 16 and 32 bits per texel respectively. The minimum width is one memory word (i.e. 16 bytes). Also if the width falls below 128, 64 or 32 texels for 8, 16 or 32 bits per texel respectively any textures with a Patch32_2 layout are automatically set to Patch2.

The address is calculated as follows. (i and j are the coordinates of the required texel.)

For linear layout the pixel offset is:

bottom left origin: −j*width+i top left origin: j*width+i.

Figure 5:
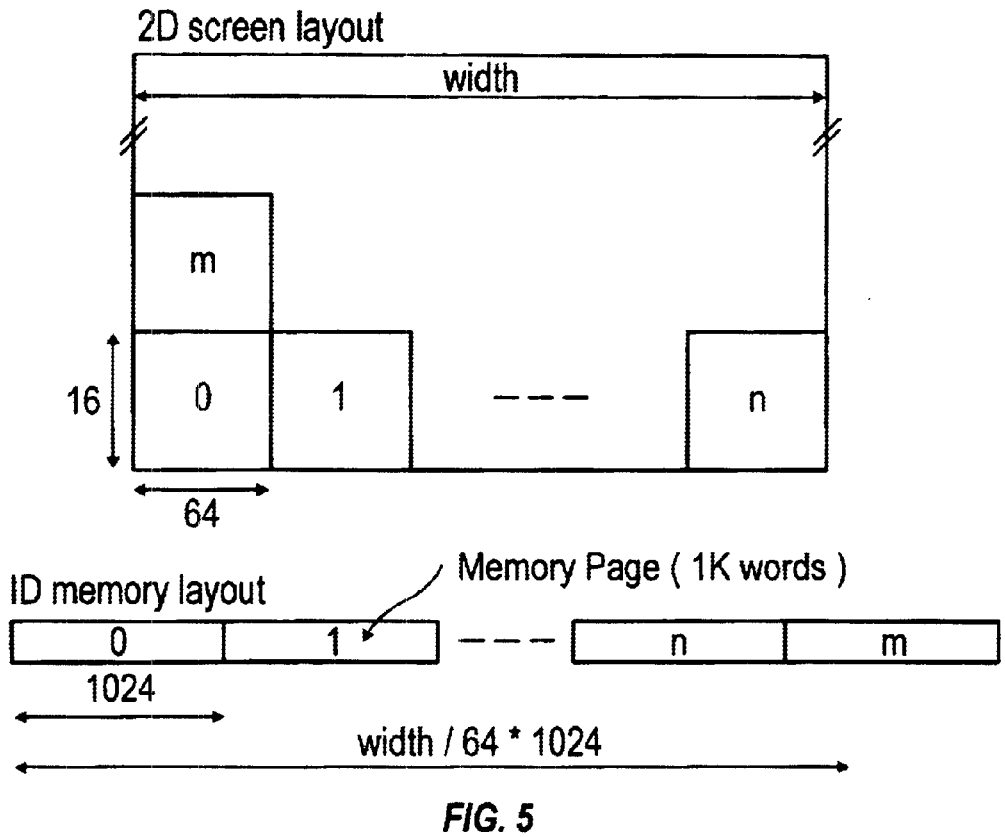
FIG. 5 shows a 2-D coordinate space mapped to a 1-D address range.

For Patch64 the 2D ij coordinate space is mapped to a 1D address range as shown in FIG. 5, in which Pixel Offset (top left origin) is given by:

| i % 64 + | // i within a patch |
| (i / 64) * 1024 + | // i between patches |
| (j % 16) * 64 + | // j within a patch |
| (j / 16) * width * 16 | // j between patches |

This can be converted into a simpler calculation just using shifts and adds:

(*i* & 0x3*f*)+((*i* & 0x*ffc*0)<<4)+((*j* & 0x*f*)<<6)+((*j* & 0x*fff*0)*width).

For bottom left origin the equation is:

$$(i \ \& \ 0\text{x}3f) + ((i \ \& \ 0\text{x}ffc0) << 4) - ((j \ \& \ 0\text{x}f) << 6) \times ((j \ \& \ 0\text{x}fff0) * \text{width})$$

For Patch2 the 2D ij coordinate space is mapped to a 1D address range as shown in the following equations:
Pixel Offset (top left origin) is given by:

| | |
|---|---|
| i % 2 + | // i within a patch |
| (i / 2) * 4 + | // i between patches |
| (j % 2) * 2 + | // j within a patch |
| (j / 2) * width * 2 | // j between patches |

This can be converted into a simpler calculation just using shifts and adds (only top left origin is supported):

$$(i \ \& \ 0\text{x}1) + ((i \ \& \ 0\text{x}fffe) << 1) + ((j \ \& \ 0\text{x}1) << 1) + ((j \ \& \ 0\text{x}fffe) * \text{width})$$

For Patch32_2 the 2D ij coordinate space is mapped to a 1D address range as shown in the following equations:
First calculate the offset to the corresponding 2×2 patch (recall there are 16×16 within a 1K page):

| | |
|---|---|
| i' = i >> 1 | |
| j' = j >> 1 | |
| (i' % 16) + | // i within a 32 × 32 patch |
| (i' / 16) * 256 + | // i between 32 × 32 patches |
| (j' % 16) * 16 + | // j within a 32 × 32 patch |
| (j' / 16) * width * 8) * 4 + | // j between 32 × 32 patches |
| | // convert from 2x2 patches to texels |

Add in the offset within the 2×2 sub patch:

| | |
|---|---|
| i % 2 + | // i within a patch |
| (j % 2) * 2 | // j within a patch. |

This can be converted into a simpler calculation just using shifts and adds (only top left origin is supported):

$$(((i' \ \& \ 0\text{x}f) + ((i' \ \& \ 0\text{x}fff0) << 4) + ((j' \ \& \ 0\text{x}f) << 4) + \\ (((j' \ \& \ 0\text{x}fff0) * \text{width}) >> 1)) << 2) + \\ (i \ \& \ 0\text{x}1) + ((j \ \& \ 0\text{x}1) << 1).$$

For a 3D texture the TextureMapSize (in texels) is multiplied by the k index (which selects the slice) to get the offset to the start of the slice the texel is on:

$$\text{texelOffset} += k * \text{TextureMapSize}.$$

Note that the TextureMapSize does not have to be width× height, but can be larger, if necessary.
Convert the texel offset into a byte offset, based on the texel size:

8 bpp: byteOffset=texellOffset*1

16 bpp: byteOffset=texelOffset*2

32 bpp: byteOffset=texelOffset*4

64 bpp: byteOffset=texelOffset*8

Add in the base address for the texture map. The base address is held as a byte address and must be aligned to the natural boundary for the texel size. For a 16 bpp address the bottom bit must be 0. For a 32 bpp address the bottom two bits must be zero. This is forced in hardware to remove any concerns of what happens if this condition is not true.

8 bpp: byteAddr=baseAddr+byteOffset 16 bpp: byteAddr=(baseAddr & ~0x1)+byteOffset 32 bpp: byteAddr=(baseAddr & ~0x3)+byteOffset 64 bpp: byteAddr=(baseAddr & ~0x7)+byteOffset All address calculations are done to 32 bit and any overflow just wraps around. The i and j coordinates are zero extended up to the required width. The bottom 4 bits of the texel's byte address give the start byte in the memory's 128 bit width and the remaining upper bits give the memory address.

Primary Cache

An efficient texture cache is vital if a sustained texture rate of one output texel per cycle is to be achieved and maintained. This is even more important when mip mapping as, in general, the zoom ratio is between 1:1 and 2:1 (output:input) so there is only moderate re-use of texel data as we move from one pixel to the next.

One way to improve this is to try to hold enough texels in the cache so that some re-use of them can be made on the next scanline. If this can be done then only one new texel per output pixel on the second scanline is needed for bilinear filtering, otherwise 2 new texels are needed. For mip mapping this translates to 1.5 new texels when making use of scanline coherence or 3 new texels without. These figures can be improved on by organizing the texel data in memory more efficiently and this will be covered later once the organizational details have been covered.

Clearly the best scheme is when all the texture map fits into cache however, at this point in time, this is not feasible except for the smallest of texture maps (32×32 at 16 bits per texel).

The cache is divided into two banks so two independent textures can be cached without any interference, or to hold two levels of a mip map, or slices of a 3D texture. When a single non mip mapped texture is being used the two caches can be joined together so a larger texture map or polygon can be rendered while still maintaining scanline coherency.

Span processing where the pixel mask (as part of the SpanStep message) is modified by the texel data does not use the primary cache.

The cache is always enabled and the only control over its operation the user has is to be able to invalidate the cache. This needs to be done whenever a new texture map is selected or the current texture map's data is edited in memory, thus causing any cached data become stale.

The cache is divided into two parts: a data part and a directory part.

Data Part

The data part holds the texel data and this can be found in the Texture Filter Unit so it is connected directly to the linear interpolators used to implement the filtering operations.

The texel data is held in "raw" format so the cache holds the maximum number of texels and the texel data is converted "on the fly" as it is needed into 8888 format the filter logic expects. The two texel formats which cannot be handled this way is the 8 bit indexed textures (replicating the conversion LUT is too expensive) and YUV 422 (the addressing and data routing gets too complicated). In these two cases the data is converted into 8888 formats and this is loaded into the cache.

Each cache line holds 128 bits of data and there are 256 cache lines in each bank for RX and 64 cache lines in each bank for P3. (These sizes are for illustration only and may be changed later.) Each cache line holds a 2×2, 4×2 or 8×2 patch of texels for 32, 16 and 8 bits per texel respectively. In the 2×2 case the cache's performance is independent of the traversal direction through the texture map, however in the other two cases the "u" direction is preferred over the "v" direction.

Figure 6:
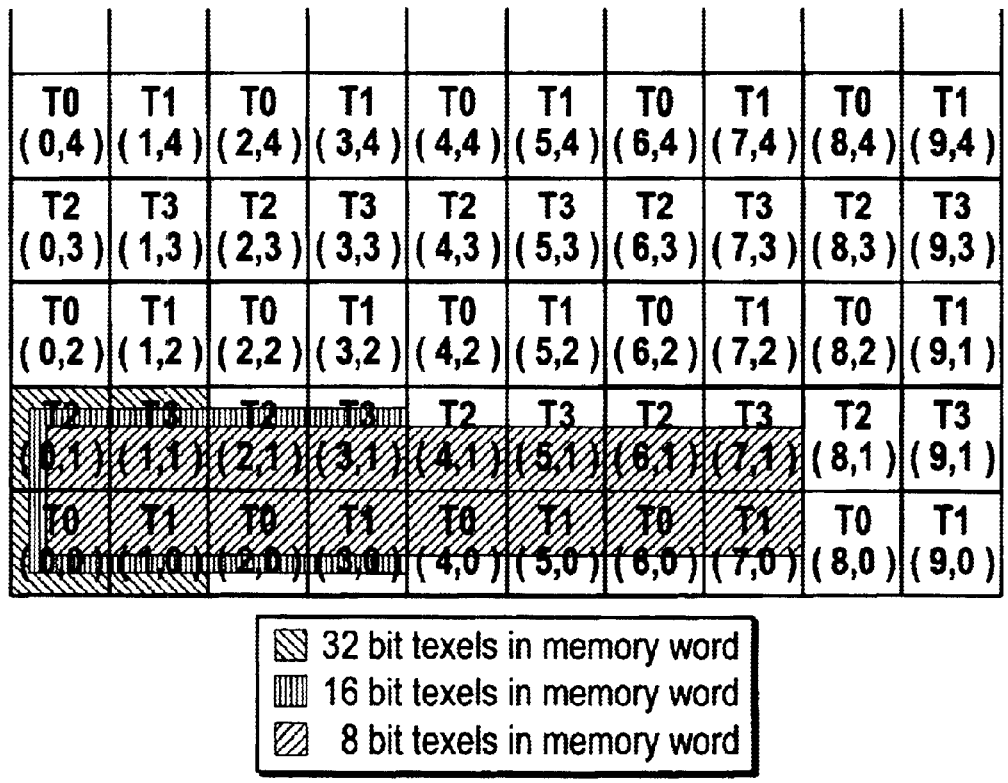
FIG. 6 shows a 2×2 patch arrangement within a texture map.

The patch (2×2, etc.) has a fixed relationship to the origin of the texture map such that the origin of the patch is always some integral multiple of the patch size from the origin of the texture map. The following diagram shows the 2×2 patch arrangement within a texture map. The numbers in the brackets show the texel coordinates within the texture map vary and the T0 . . . T3 are the corresponding filter registers each texel is assigned. The grey areas are show the texels held in a memory word (16 bytes) for each size of texel. The texture map may also be patched at a higher level (32×32) to reduce the effect of page breaks but this is of no consequence to how the primary cache functions (see FIG. 6).

The organization of texture maps within memory is important and tries to meet several criteria:

The performance should be independent of the traversal direction, especially for "large" texture maps (i.e. >32× 32). Storing the texture map in a linear fashion gives very good access times in the u direction but poor access times in the v direction due to the page organization of DRAMS. Storing the texture maps in a patch form (32×32 in our case for 32 bit texels) equalizes the access times.

The memory width is very much wider than the texel width so each memory read returns multiple texels. If the texel data in a memory word are all for the same row then all the data is used when traversing in u (along a row) but very little is used in the v direction (along a column). The 2×2 patch organization ensures that at least 2 texels can be used from each memory read for all traversal directions.

Texture maps are preferably stored in memory in one of the 2×2 patched formats to give the best overall performance for general 3D use, however this is not always possible or desirable. For example if the texture data originates from an external source or is used to drive an external device (i.e. a monitor) the layout of the data may be fixed and not in 2×2 format. Alternatively the traversal direction may be known to always be in the u direction—examples of this are video scaling, fonts and general 2D use.

When the texture map is stored in memory in a non 2×2 layout it is formatted into the 2×2 layout expected by the Filter Unit as it is read in.

The layout in memory for the various supported format is shown in FIGS. 7A–7B. Each line is one memory word and the bit numbers are shown along the top. The tick marks are at byte intervals and the numbers in brackets show how the texel coordinates vary within the memory word.

Note in the Linear and Patch64 cases only one alignment has been shown. The origin can be in 4, 8 or 16 places with respect to the width of the memory word (16 bytes) for 32, 16 or 8 bit texels respectively.

Directory Part

The directory part of the primary cache is held in this unit and is searched to find out if a texel is already in the primary cache, and if so where. The search is done fully associatively and 8 texels (four per cache bank) are searched simultaneously (to support the target performance of trilinear filtering or two bilinear filtered texels in a cycle). The replacement policy is oldest first (FIFO). These parameters will be justified later.

The key stored in the cache directory is formed from the texel's integer coordinate (i, j) and map level (or k for 3D texture). A bank of the cache cannot hold texels from different texture maps (texels from the different levels in a mip map or from the different slices in a 3D texture can be held in the same bank). This means that the cache must be invalidated whenever a new texture map is selected.

Why not use the texel's address as the key then the cache can hold texels from different maps and does not need to be invalidated when a different texture map is selected? The answer is that the address calculation for 8 texels would need to be done in parallel and this would be quite expensive. This unit is supplied i0, i1 and j0, j1 indices (these would be necessary for the address computation) and the four texels (just considering one bank) are given by (i0, j0), (i1, j0), (i0, j1) and (i1, j1).

The typical search policies are fully associative, set associative and direct mapped. These are graded from most expensive, most flexible (fully associative) to least expensive, least flexible (direct mapped). Set associative and direct mapped both rely on using a subset of index bits to choose one (direct mapped) or a set of locations to search.

The access patterns through a 2D texture map follow an approximate straight line. (It is actually a slightly curved line due to the perspective projection, but this is a minor effect and doesn't change any of the reasoning.) The orientation of the line and its position is arbitrary and successive scanline will all follow on approximately parallel paths. The other variable to contend with is the width of the texture map— this is variable (between texture maps) and a power of two. Given these constrains choosing a set of index bits to which will give a good distribution for each possible orientation of line looks an impossible task. A good distribution is vital otherwise, in the worst case, all texels along a line could fall into one set (or a single entry for direct mapped)—clearly this will defeat the purpose of a cache. The fully associative search works equally well for all access patterns.

The common replacement policies are least recently used (LRU), oldest (FIFO), least frequently used and random. The LRU policy usually gives excellent result but is the most expensive, however the approximately regular access patterns repeated from scanline to scanline will make the least recently used page the same as the oldest page (at least within the same polygon). The oldest replacement policy is implemented by a simple counter which selects the entry to replace and is incremented after every replacement. The counter wraps within the available table size.

An alternative replacement policy (KeepOldest) is also supported which is the same as oldest up until the point the cache is about to wrap on a scanline (i.e. earlier cache lines on the scanline are going to be replaced). When the wrap occurs rather than starting back at the first entry used on the scanline the last n entries are reused as scratch cache lines. This prevents scanline coherency from being lost for the whole of the next scanline, but places some restrictions on the amount of expedited loading of the cache which can be done. It is difficult to know how big the scratch area should be for the best trade off between maintaining some scanline coherency and more stalling due to less effective cache loads. The value of n is programmable (the TextureCacheReplacementMode).

The size of the cache is a compromise—the larger the better, but it follows the law of diminishing returns. The minimum useful size is based on the number of texels visited along any path through the texture map. This will be the minimum of the texture map size and width of the polygon. The cache is patched based so holds a minimum of two rows (maybe only partial rows) at a time. The filter may require texels from two adjacent patches (in v) so in the worst case two pairs of rows are needed. If a bank holds n bytes of data the maximum width of texture map (or texels along a polygon) which can be held while maintaining scanline coherency is n/(bytes per texel)/4.

For P3 each bank has 1K bytes of storage so for 16 bit textures the cache works best when less than 128 texels are used for mip maps or 256 texels for a single texture map (where both caches can be combined).

For RX each bank has 4K bytes of storage so for 32 bit textures the cache works best when less than 256 texels are used for mip maps or 512 texels for a single texture map (where both caches can be combined).

The fully associative search is expensive and the two factors which govern the cost are the number of entries to search and the width of the key. The number of entries is governed by the cache line length and the total amount of data in the cache bank. The cache line length and size of the cache have already been considered, but what about the key?

Figure 8:
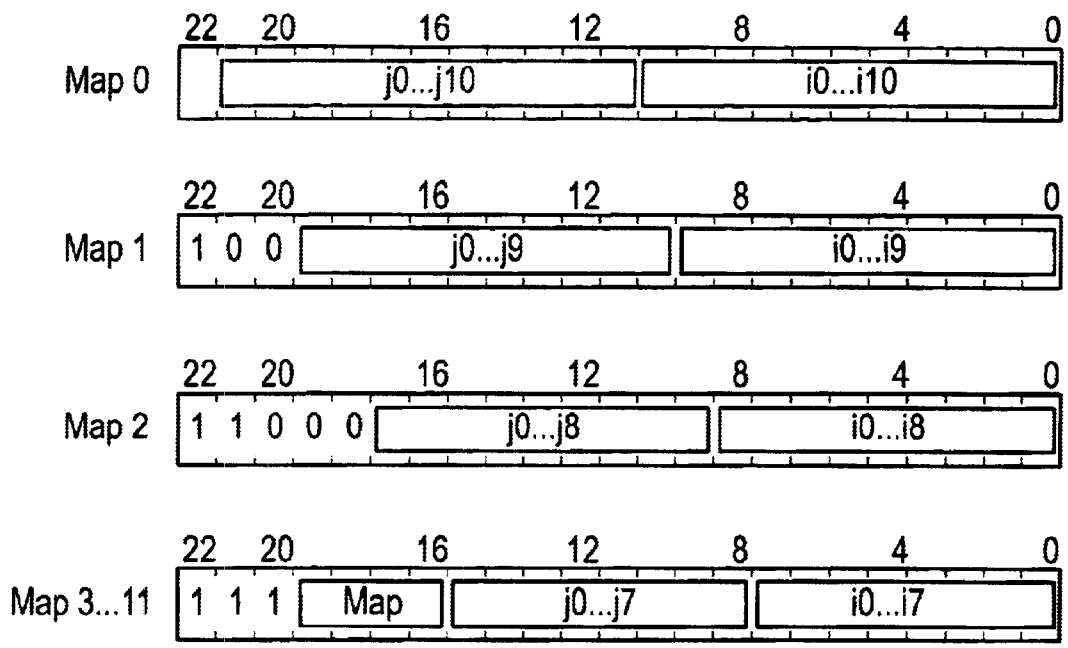
FIG. 8 shows how the map level and address can be encoded into the least amount of bits.

The key (as already described) holds the i and j index and the map level (3D textures will be considered shortly). The maximum width and height of a map is 2050 (2K+a border) so the indices have 12 bits. The cache line holds a 2×2 patch so the indices can be reduced by one bit to 11 bits. The number of map level is needed here. In total the key is (11+11+4) bits or 26. This can be reduced down to 23 by realizing that the full 2050×2050 value can only occur on map level 0. Map level 1 has a maximum size of 1026×1026 so by encoding the map into the upper bits as shown in FIG. 8, the key width can be reduced.

Note that supporting a border on a 2K×2K map is probably an overkill for P3 (a 2K width map is useful for 2D applications to cope with a monitor width of 1600 or 1920). If the border was not supported on a 2K map then the key width could optionally be reduced to 21 bits.

Three dimensional texture maps have a larger key requirement—the map bits are replaced by the k index. The i and j index are 11 bits as above and the k index is 12 bits. The even k slices are stored in bank 0 while the odd k slices are in bank 1 so the least significant bit of k can be dropped. This gives a key size of 33 bits and is larger than the total address space most processors have. The key for 3D textures is formed by concatenating the significant bits of the i, j and k indices together. The number of significant bits for the i and j indices are held in TextureReadMode0.Width and TextureReadMode0.Height respectively. A 23 bit key allows a 3D texture to have $2^{23}$ texels in it or a cuboid of 256×256×128 without the risk of multiple texels aliasing to the same key (the reduced 21 bit key for P3 would allow a maximum cube size of 128×128×128). Both these cuboids (or any other with the same volume) are probably sufficient for a P3 class product but are marginal for an RX class of product. For RX the key size has been increased to 27 bits to allow a maximum cube size of 512×512×512.

Combining Both Cache Banks

The two independent cache banks are ideal for mip mapping, 3D textures and when two independent texture maps are being used but when a single texture map is being used (a common occurrence) it is very wasteful to have half the cache idle.

The Filter Unit can be put into a mode where the register files from bank 1 are used to extend the corresponding register files in bank 0.

The TextureReadMode0.CombineCaches bit is used to enable this mode of operation and when set the texels are alternately loaded into each bank. The texture 0 indices are used and are checked in both banks for their presence. Obviously only one bank should report that a texel is present and this is used to select which register file is to supply the texel data. This bank select bit is passed to the Filter Unit in the T4BorderColor to T7BorderColor bits as these are not needed in this mode of operation.

Loading the Cache

Any caching scheme is going to suffer from cache misses where the only option open is to go and read the texel data from memory. The latency for the data to return may be anything from a few cycles to many tens of cycles depending on how busy the memory is and if the texture request introduces a page break. (This assumes that the texture is resident in memory or is a physical texture. If the texture is non-resident then the time for it to be fetched from host memory could be thousands of cycles at best or many more if the host has to respond to an interrupt, page the texture off disk and then download it.)

Figure 9:
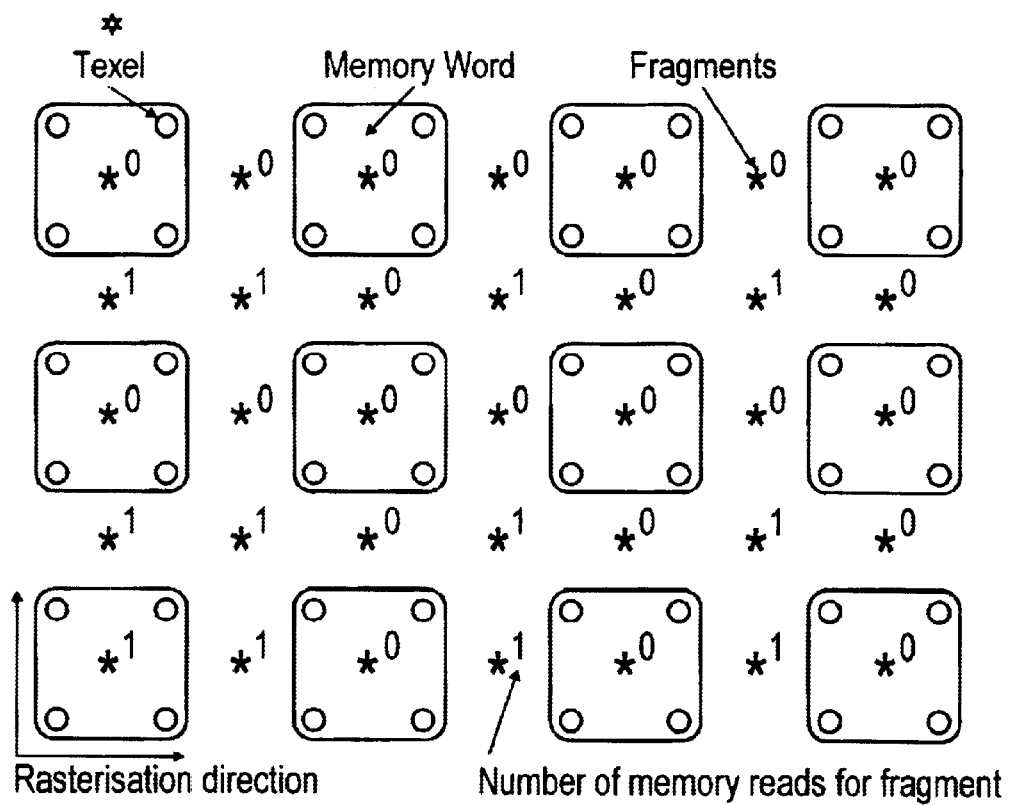
FIG. 9 shows which texels the memory reads bring in and the corresponding output fragments they will satisfy.

A fragment could cause from one to eight memory reads, although if the cache is working well and scanline coherency is being made use of this will very much reduced. (The pathological case is where bilinear filtering is being done with a zoom ratio of 1:n, where n>1. In this case we are minifying the map and no coherence between adjacent fragments or scanlines can be exploited. From 1 to 4 reads per fragment are needed depending on how the sample points interact with the underlying 2×2 patch structure in the texture map.) FIG. 9 shows which texels the memory reads bring in and the corresponding output fragments they will satisfy. The zoom ratio of 1:1 is used as this is the worst case for mip mapping and occurs for the higher resolution map; the lower resolution map will have a zoom ratio of 2:1 so any results for this map level will be twice as good. A texel size of 32 bits is also assumed so these results are independent of any path orientation. The smaller texels sizes will give better results for X major paths.

From this figure it can be seen that for the interior fragments on even rows no memory reads are required (because all the texel data was read in for the previous odd row) while for odd rows there is a read for every other fragment, F(number of reads):

Even rows: F(0), F(0), F(0), F(0), F(0), F(0), F(0), etc.

Odd rows: F(1), F(0), F(1), F(0), F(1), F(0), F(1), etc.

The next lower resolution map:

Row 0: F(0), F(0), F(0), F(0), F(0), F(0), F(0), etc.

Row 1: F(0), F(0), F(0), F(0), F(0), F(0), F(0), etc.

Row 2: F(0), F(0), F(0), F(0), F(0), F(0), F(0), etc.

Row 3: F(1), F(0), F(0), F(0), F(1), F(0), F(0), etc.

Combining these together for the rows where there are accesses from both levels give:

F(2), F(0), F(1), F(0), F(2), F(0), F(1), etc.

Obviously for the first scanline and at the edges the number of reads per fragment are much larger and more frequent.

The cache management, address calculation and memory requests are being processed many fragments in advance of the fragments the filter unit is working on (determined largely by the depth of the M FIFO in this unit). So assuming the data is returned back from the memory quick enough it may be possible to have the texel data loaded into the primary cache before it is needed. This can be achieved if the step message collects the texel data as it leaves this unit (in much the same way as occurs in the LB Read Unit and FB Read Unit) but this requires write-through register files (probably not much of an issue) in the Filter Unit but does nothing to help the case where more than one load is needed to fulfil all the new texel data for this step message.

Multiple loads for a step message are common (as outlined above) but typically there are spare load slots on steps which require no new data. We would like to make use of these spare slots otherwise we will take a performance hit on some fragments. For the interior row shown this amounts to 5 cycles for 4 fragments, but the edges will take a bigger hit.

Expedited loading of the cache has been implemented so texel data is loaded in advance of when it is needed, potentially by many cycles. Data returned from the Memory Controller is loaded into the Filter Unit as soon as it is available rather than waiting for the initiating step message.

Information to control the loading of the primary cache is passed to the output stage (called the Dispatcher) in the T FIFO. The step message is passed in a parallel, but independent M FIFO. The Dispatcher will append the new texel data to any message, or if no message is going to be sent to the Filter Unit in this cycle it will inject it's own just to load the primary cache.

The expedited loading introduces a few problems of its own which need to be solved to make the scheme viable:

(1) The expedited texels cannot overwrite texels which may be referenced by step messages which are queued up in the M FIFO until the original texel data has been used. This should be a rare occurrence and only happen when the number of texels used on a scanline is approximately the same as the texture cache can hold.

(2) Memory latency or just the amount of data required for a step may mean the step reaches the Dispatcher before all the data has been loaded into the cache so the step message must be delayed.

The solution for (1) adopted is to only update the T FIFO with the expedited load information while there are no steps in the M FIFO (or the current step we are working on which has not been entered into the M FIFO yet) which reference the cache line assigned to be updated.

This entails a FIFO design which can have its valid entries tested for equality to see if any of them use the target cache line. The 72 bits [8×(8 address bits+1 valid bit)] of the FIFO width which hold the cache address for each of the 8 texels the step references are available as individual registers and have comparators so the test is done in parallel. The remaining width of the FIFO can be held in a normal FIFO.

Waiting for the offending step(s) to be flushed out of the M FIFO degrades the performance gain we are trying to achieve, and in any case will deadlock when the current step references the cache line we have chosen to replace. Instead we try to find a different cache line which is not referenced by the current step or any queued up in the M FIFO.

Recall the preferred replacement policy is to replace the oldest entry, but in fact we can replace any entry which is not referenced. Which entry should we replace? Some options are:

We could keep incrementing from the oldest entry looking for the first entry we can replace. This is very simple but suffers from taking several cycles and we are very likely to bump texels one of the following step message would like to use.

Change the cache policy to be LRU (or something else). Unfortunately this adds significantly to the cost of the cache so isn't really an option.

Start looking for an unused entry at some offset from the current position, say at half the cache's size from where we are now. If this fails then linearly search until an entry is found (which is always guaranteed as the M FIFO is draining so freeing up cache lines at it goes). This is a good compromise as it doesn't destroy the scanline coherency of the following steps (but may well do so for steps further into the future), should just cost a single cycle in most cases and in the limit is fail safe in that it will wait for the FIFO to drain.

The solution to (2) is for the Dispatcher to maintain a running count of texels loaded into the Filter Unit. As each step message reaches the Dispatcher the running count (called texelsLoaded in the behavioral model) it checked against the number of texels needed to be read by this step. If the texelsLoaded is greater than or equal to what the step needs the step is allowed to proceed to the Filter Unit, otherwise it stalls until sufficient data has been loaded. Once the step is allowed to proceed the texelsLoaded value is decremented by the number of loads the step message was waiting for.

The bottom line is this cache architecture and memory organization is up to 8 times more efficient than the GLINT MX as measured in number of memory reads per output fragment for 1:1 zoom ratio.

Secondary Cache

The secondary cache, at least compared to the primary cache is a very simple affair. For normal texture mapping it is largely superfluous except in the following cases:

The texture layout in memory is Linear or Patch64. In these two cases the texture must first be converted to 2×2 patch format before it is loaded into the primary cache. The secondary cache holds the data while this reformatting or aligning is being done. It also allows some re-use of data as the two memory reads needed to build up the 2×2 patch may be able to be used on the next 2×2 patch.

The texture map is an 8 bit indexed texture map. These are converted into 32 bit textures to be stored in the Filter Unit. The next primary cache load may well use 8 bit texels from the secondary cache rather than having read data from memory.

The texture data is going to be used for span processing. Span processing does not use the primary cache so the secondary cache it its only way of reducing the memory bandwidth needed.

The secondary cache has four lines where each line holds 128 bits. Why four lines? There are two texture maps and each map can use two memory reads when in Linear or Patch64 layout. The span processing use all four lines to hold up to 512 bits of bit map data, but little re-use would be normally expected—the main gain is reading 128 bits of a font (for example) in one go and extracting several rows worth of bit mask data from this.

The secondary cache is direct mapped (spans use a different algorithm) so the search and replacement policies are very simple and cheap. The cache directory holds addresses (rather than indices as the primary cache does) and these may be logical addresses or physical addresses. An extra bit identifies the type of address so a new logical address cannot alias with an old physical address, for example.

The secondary cache is always enabled and the only use control is to be able to invalidate it using the Invalidate-Cache command. This cache should be invalidated whenever texture data has been changed in memory and this data may have been in the secondary cache. (This is never a problem when the Virtual Texture Management changes a texture in memory as the secondary cache holds the logical address and this is invariant unless software re-assigns this logical address to a new texture map. The act of updating the Logical Page Tables through the core will automatically invalidate the secondary cache.)

Virtual Texture Management

Texture maps can be stored in physical memory or in logical/virtual memory. If the texture map is stored in physical memory then it must be physically contiguous and present before that texture is used.

The management of physical textures is complicated by the fact that an application can request more textures than can fit into on-card memory so the textures need to be dynamically swapped, however this is not an easy task to do well because:

The need to swapping and usage are decoupled in time by the DMA buffers.

The memory granularity is controlled by the texture map size so is continually changing.

Memory gets fragmented.

There is no clear replacement policy.

There are a number of solutions to solving this problem:

Increase the amount of physical memory to hold texture maps. This is not always possible due to cost or board area constraints and in any case just delays the point at which the problem will re-occur, rather than fixing it altogether.

Allow textures to be executed out of host memory via the AGP or PCI bus. This is a similar solution to the previous one, except it doesn't have the cost or board area constraints (at least as far as the graphics board is concerned). The downside of this is the bandwidth across the AGP bus is likely to be inferior to the bandwidth out of local memory. Also the latency for the texture data to arrive may degrade texture performance. This method is supported by setting the HostTexture bit in the TextureMapWidth registers. These texture reads will be done across the AGP bus. The PCI bus can be used but because it lacks the efficient random in-page addressing AGP has the texture accesses will be very slow. Note that there may be system reasons why such a method will not work or work poorly. A system with a GLINT Gamma cannot do this type of access (across AGP) and multiple RX's would require too much bandwidth and not interleave accesses very well.

The final solution is to treat the texture addresses as logical or virtual addresses. The logical part allows texture maps to be stored in non-contiguous physical pages (a page is 4K bytes). This simplifies the memory management aspect as the granularity now is at the page level. The virtual part allows the dynamic paging of textures out of host or system memory with or without any assistance from the host CPU. This is done on demand so borrows many of the techniques used for CPU memory management. The virtual texture management (of which the logical addressing is a necessary sub-set) is implemented as standard in this unit and will now be described in detail.

Host textures can also be managed; the main difference is that no texture data is downloaded, but is accessed "in situ" using the side band addressing capability of the AGP texture execute mode.

Mapping an Address

A brief overview of the sequence of events which occur for a logical texture when the texel causes a primary cache miss will be described. Later on a detailed description will be presented.

The texel has its logical byte address calculated from it's integer coordinates, base address of the texture, texture map width, etc.

The logical page the logical address resides in is calculated and the Translation Look aside Buffer (TLB) checked to see if the physical page assigned to the logical page is present. If it is the physical address is formed from the physical page number and the low order bits of the logical address. Note the physical page is relative to the start of the working set and not physical memory. The physical address is then posted to the memory controller.

If the logical page is not present in the TLB then the Logical Page Table entry for this logical page is read. If the resident bit is set then the logical page is present in the working set and its physical page is read from the Logical Page Table. The TLB is updated so the next time this logical page is accessed the physical page is to hand. The physical address is formed from the physical page number and the low order bits of the logical address and then posted to the memory controller.

If the logical page is not resident in the working set then details about the page (its host address, target memory pool, etc.) is made available to the host or DMA controller. (The DMA controller is in Gamma for RXs or is integrated into P3.) Sometime later the working set has been updated with the new page of texture data and the Logical Page Table updated to show the faulting logical page is now resident and its physical address. The TLB is updated so the next time this logical page is accessed the physical page is to hand. The physical address is formed from the physical page number and the low order bits of the logical address and then posted to the memory controller.

Logical Page Mapping

The size of each page is always 4K bytes so the bottom 12 bits of a texel byte address give the byte within a page while the next 16 bits give the page number (the remaining 4 most significant bits are ignored). This gives a maximum virtual texture size of 65536 pages or 256 MBytes. The working set can be any number of pages in size. Each logical page has 8 bytes of overhead (in the Logical Page Table) and each physical page has 8 bytes of overhead (in the Physical Page Allocation Table). Some typical sizes for these is tables are:

| Managed Memory (pages/MBytes) | Table Size |
|---|---|
| 256/1 MByte | 1 KBytes |
| 512/2 MByte | 2 KBytes |
| 1024/4 MByte | 4 KBytes |
| 2048/8 MByte | 8 KBytes |
| 4096/16 MByte | 16 KBytes |
| 8192/32 MByte | 32 KBytes |

The Logical Page Table is typically much bigger than the Physical Page Allocation Table. The Logical Page Table must be physically contiguous and is allocated in local buffer memory. The Physical Page Allocatoin Table must be physically contiguous and is allocated in local buffer memory.

Memory Pools

The texture maps can be stored anywhere in the on card memory, however two factors influence where the optimum place the texture should be stored:

The column/row/bank structure of the memory devices result in the memory being divided up into pages (not to be confused with logical or physical pages previously discussed). (Some alignments and layouts are more efficient than others.) Access times within a DRAM page are much faster than out of page accesses. SDRAM and SGRAM have multiple banks so can have multiple open pages. When mip mapping or when two independent textures maps are being used it is advantageous if the texture maps (or adjacent levels) are in different banks. (If two or more mip map levels fit into the same DRAM page then this is not necessary.) Placing the two levels or maps in the same bank, but different pages can cause a page break for each texel access—something guaranteed to hurt performance.

The position of other buffers which are being simultaneously accessed is another important consideration and texture map placement should avoid these banks whenever possible.

For physical textures this assignment is totally up to software to decide, however for virtual textures the assignment to physical memory is under hardware control. To assist the hardware in placing the textures in an optimum memory bank the memory is divided up into four memory pools. Normally a pool would hold pages from a single memory bank.

The Logical Page Table identifies which pool each logical page should be assigned to when that logical page is loaded into memory.

Multi-RX Consideration

In a single RX or P3 system when a page fault occurs it would be feasible for the TextureDownload Controller to go and fetch the page immediately and then proceed once the page was in memory.

In a multi-RX system this method could also be used, however it is very likely that a page fault in one RX will be followed by a page fault in another RX for the same page. If each RX were to go and fetch the faulting page independently then the effective texture download bandwidth will be reduced proportionally to the number of RXs in the system.

Each RX will accept a texture download at any time even if it has no outstanding requests. This means that the first RX to fault will have the faulting page of texture data loaded into itself and also all other RXs. If the other RXs had faulted soon afterwards on the same page they would remove their request when they detected this page being downloaded.

When a page fault is detected RX will inform Gamma (or the Gamma-like Texture DMA Controller in P3) that it needs a page of texture data to be downloaded. Gamma will either interrupt the host and the host software will make available the texture data and start the download, or automatically DMA from the hosts memory.

The following hardware signals are used to communicate between each RX and Gamma:

TextureDownloadRequest. This signal is asserted by RX to request a texture download. It is de-asserted once the texture download has started.

TextureFIFOFull. This signal is asserted by RX when it is not able to accept any more data being written into the TextureInput FIFO.

When Gamma has detected an RX is requesting a texture download it reads three PCI registers in the requesting RX. These registers are:

HostTextureAddress. This register holds the host address where the texture resides. This is either a physical address or a virtual address. A bit in the TextureOperation register identifies the type of address. If the address is a virtual address then an interrupt is generated and the host will read the address and initiate the DMA once the data has been made available.

LogicalTexturePage. This register holds the logical page for the texture data and is returned back to the RXs in the two word header preceding the actual texture data. In a multi-RX system all the RXs take the texture download and not just the RX which requested it.

TextureOperation. This register holds the transfer length (=1024 words) in the bottom 11 bits and a bit to say if the host texture address is a physical or virtual address (bit 11). If the address type is virtual then the TextureDownload interrupt is generated, if enabled.

Gamma broadcasts the LogialTextureAddress and TextureOperation words to the TextureInput FIFO before the actual texture data. The RXs on seeing this information will remove any TextureDownloadRequest this transfer will satisfy and allocate space in its texture working set for the new texture page.

TLB

The TLB is a fully associative table (or content addressable memory) which caches the recent logical to physical page mappings. It is first check to see if the mapping we want for this page is present as this is much faster than having to query the Logical Page Table in memory. The TLB search happens in a single cycle and is 16 entries for P3 and 64 entries for RX. The replacement policy is oldest first.

A TLB can be classified according to its search policy, its replacement policy and its size. A justification for the chosen attributes will now be given.

The typical search policies are fully associative, set associative and direct mapped. These are graded from most expensive, most flexible (fully associative) to least expensive, least flexible (direct mapped). Set associative and direct mapped both rely on using a subset of address bits to choose one (direct mapped) or a set of locations to search.

The access patterns through a 2D texture map follow an approximate straight line. (It is actually a slightly curved line due to the perspective projection, but this is a minor is effect and doesn't change any of the reasoning.) The orientation of the line and its position is arbitrary and successive scanline will all follow on approximately parallel paths. The other variable to contend with is the width of the texture map—this is variable (between texture maps) and a power of two. Given these constrains choosing a set of address bits to which will give a good distribution for each possible orientation of line looks an impossible task. A good distribution is vital otherwise, in the worst case, all addresses along a line could fall into one set (or a single entry for direct mapped)—clearly this will defeat the purpose of a TLB. The fully associative search works equally well in all access patterns.

The common replacement policies are least recently used (LRU), oldest (FIFO), least frequently used and random. The LRU policy usually gives excellent result but is the most expensive, however the approximately regular access patterns repeated from scanline to scanline will make the least recently used page the same as the oldest page (at least within the same polygon). The oldest replacement policy is implemented by a simple counter which selects the entry to replace and is incremented after every replacement. The counter wraps within the available table size.

The size of the TLB is a compromise—the larger the better, but it follows the law of diminishing returns. The minimum useful size is based on the number of pages visited along any path through the texture map. Texture maps are preferably patched 32×32 (a patch at 32 bits per texel is the same size as a page).

For P3 the sweet spot is 256×256 mip mapped or 8 pages for level 0 plus 4 pages for level 1 along a line. A 512×512 non mip mapped texture map will hit 16 pages along a line. The texel size is 16 bits so X-major lines will hit half the number of pages. A 16 entry TLB covers these sizes well.

For RX the sweet spot is 1024×1024 mip mapped or 32 pages for level 0 plus 16 pages for level 1 along a line. A 2048×2048 non mip mapped texture map will hit 64 pages along a line. A 64 entry TLB covers these sizes well.

A TLB miss will cause a single read of the Logical Page Table—the cost of this is difficult to quantify because is depends on how busy the memory system is and if it causes a page break. In the worst case where there are too few entries in the TLB to cover the length of the access path (i.e. no scanline to scanline coherence is being used) the TLB miss time will be amortised over a minimum of 16 texel reads. (This assumes a one to one mapping between telexes and pixels and takes into account that textures are stored as 2×2 patches—i.e. there are 16 2×2 minor patches in a 32×32 major patch.)

The TLB can be invalidated by using the InvalidateCache command with bit 2 set and this should be done whenever the host changes the Logical Page Table directly through the bypass. Changes to the Logical Page Table via the UpdateLogicalTextureInfo command will automatically invalidate those logical pages which are updated, if present in the TLB.
Logical Page Table The Logical Page Table has one entry per logical page and each entry has the following format:

must also be updated to remove the reference (if any) to the logical page being updated. The TLB should be invalidated incase the updated Logical Page Table has left any stale data in the TLB. The InvalidateCache command (with bit 2 set) can be used to do this.

The table can also be updated via the normal command stream using the SetLogicalTexturePage command to set the first page to update. The data for bits 32 . . . 63 is supplied with the UpdateLogicalTextureInfo command and this will update the Logical Page Table at the previously set page and do all the necessary housekeeping. The logical page to update is auto-incremented so several consecutive table entries are updated. Updates beyond the number of entries in the table (as set by LogicalTexturePageTableLength) are discarded and leave the memory untouched.

| Bit No | Name | Description |
| --- | --- | --- |
| 0–15 | Physical Page | These bits hold the physical page number relative to the start of the working set where this logical page is held. If the page is not resident (next field) then these bits are ignored (but will frequently be set to zero). This field is normally maintained by RX, except when the page is marked as a HostTexture. |
| 16 | Resident | This bit, when set, marks this logical page as resident in the working set. This field is normally maintained by RX, except when the page is marked as a HostTexture. |
| 17 | Host Texture | This bit, when set, marks this logical page as resident in the host memory and it should be accessed using AGP texture execute mode rather than downloading it. The Length field should also be set to zero. |
| 18–31 | Reserved | This field is not used but is set to zero whenever the Resident bit is updated. |
| 32–40 | Length | This field holds the number of 128 bit words to transfer when a page fault occurs. This allows a page to hold a texture map smaller than 4K without spending the extra download time on the unused words. There is no way to download to unused portion without overwriting the used part. When the physical page is in host memory the length field must be set to zero. This field is maintained by the host. |
| 41–42 | Memory Pool | This field holds the memory pool this logical page should be allocated out of. This field is maintained by the host. |
| 43 | Virtual Host Page | This bit, when set, indicates the HostPage (next field) is a virtual page in host memory so cannot be accessed directly. Setting this bit will generate an interrupt and involve the host in providing this page of texture data. When this bit is 0 the HostPage is the physical page and will be read directly with no host intervention. This field is maintained by the host. |
| 44–63 | Host Page | This field holds the page in host memory where the texture data is held. This is a virtual host page or a physical host page as indicated by the VirtualHostPage bit (previous field). This field is maintained by the host. |

The first word in each entry is basically read and written by RX during the memory management activities unless the page is an host texture in which case the host is responsible for the first word as well. The second word is written by the host (either directly via the bypass or via the core using messages) and just read by RX.

The base address of the table is held in the LogicalTexturePageTableAddr register and is aligned to a 64 bit boundary. The number of entries in the table is held in the LogicalTexturePageTableLength register and each logical page number is tested against this limit. If the logical page number is out of range then the address is always mapped into page 0 of the working set and will never cause a texture download. (As a debug aid page 0 of the working set can be missed out of the Physical Page Allocation Table and initialized to some distinctive texture map so any out of range texture mappings cause a distinctive visual effect.) The LogicalTexturePageTableLength is initialized to zero during reset which effectively disabled the logical and virtual texture management.

The table can be updated by the host directly via the bypass once the chip has been synced to make sure there are no conflicting accesses. The Physical Page Allocation Table The logical table is updated by:
Memory Allocator to mark a logical page as non resident when its allocated physical page is reclaimed and assigned to another logical address.
The Download Controller to update the resident bit and physical page field once the download is complete.
Memory Allocation When there is a new page of non host texture data to load into the working set a physical page needs to be allocated to it from the specified pool of memory. The least recently used page in the specified pool is used.

Keeping track of the least recently used page is done by a queue. Whenever a page is first accessed (easily identified by a TLB miss on the page) it is moved to the head of the queue. It therefore follows that the page at the tail of the queue is the least recently used so is the one allocated to the new texture page. This physical page may already be assigned to a logical page so that logical page is marked as non-resident in the Logical Page Table and removed from the TLB. (It is most unlikely it is in the TLB as the working set will normally hold many more pages than the TLB does.)

The queue used to track the physical pages is held in the Physical Page Allocation Table. This table has one entry per physical page and each entry has the following format:

| BitNo | Name | Description |
|---|---|---|
| 0–15 | Logical Page | These bits hold the logical page number this physical page has been assigned to. If no assignment has been made (or it has been removed) then the valid bit (next field) will be zero and these bits are ignored (but will frequently be set to zero). |
| 16 | Valid | This bit, when set, marks this logical page as resident in the working set. This field is normally maintained by RX. |
| 17–31 | Reserved | This field is not used but is set to zero whenever the Resident bit is updated. |
| 32–47 | Next Page | This field holds the page number of the next page in the pool - i.e. the next recently used page. |
| 36–63 | Previous Page | This field holds the page number of the previous page in the pool - i.e. the previous recently used page. |

The Physical Page Allocation Table is not normally accessed by the host. The two exceptions are during power-on initialization and if pages are to be locked down. See later for information on these.

The NextPage and PrevPage fields are used to form a double linked list of the pages assigned to a memory pool. The double linked list is a classic data structure for building queues from as it allows fixed time insertion and deletions. In this application a deletion can occur from any queue entry, but insertions only occur at the head. The head entry is the most recently used physical page and the tail entry is the least recently used page.

A traditional linked list suffers from a linear search time, but by combining it with an array (i.e. table) a constant search time to find a given physical page is guaranteed—you just use the physical page number to index into the table. This is important as a frequent operation is to make a specific physical page the most recent. This involves searching for this page and updating the head (and maybe the tail) pointer to move this page to the head of the queue.

Each memory pool has a head and tail page. These are held in the HeadPhysicalPageAllocation[0 . . . 3] and TailPhysicalPageAllocation[0 . . . 3] registers respectively and the index relates to each memory pool. These registers are initialized by software at the start of day, but there after are read and written by the hardware.

The PrevPage field for the head page is ignored and will hold links which should be ignored. Similarly for the NextPage field for the tail page.

The maximum size the Physical Page Allocation Table needs to be is the amount of LB memory plus amount of FB memory (in MBytes) divided by 4096. (There is no reason why the Physical Page Allocation Table could not be smaller and just cover the contiguous region set aside for dynamic texture management. Having it cover all the on card memory helps to illustrate some points.) This gives one entry for each 4K page on the card. Many of these pages are not available for virtual texture storage because:

They hold the color buffers.
They hold the Z, stencil, etc. buffer.
They hold the overlay buffers.
They hold the video overlay buffers.
They hold non logical textures, icons, fonts, bitmaps, etc.
They hold the Logical Page Table.
They hold the Physical Page Allocation Table.
Run length encoded window ID information.
They hold logical textures which have been locked down.
These pages are not included in any of the four linked lists so are ignored by the memory allocation hardware.

Programming Notes for Non Host Textures

Following is some general programming information on how the virtual texture management hardware is used.

Start of Day Initialization

Before any logical or virtual texture management can be done there are a number of areas which need to be initialized (in addition to the usual mode, etc. register initialization):

Space for the Logical Texture Page Table must be reserved in the local buffer and the table initialized to zero. The LogicalTexturePageAddr and LogicalTexturePageTableLength must be set up.

Space for the working set must be reserved in the local buffer and/or framebuffer. This need not be physically consecutive pages. The BasePageOfWorkingSet register is set up.

If virtual texture management is to be used then the following additional initialization is required:

Space for the Physical Page Allocation Table is reserved in the local buffer and PhysicalPageAllocationTableAddr register is set up to point to it.

Bits 0 . . . 31 of each entry in the Physical Page Allocation Table is set to zero—to clear the valid bit.

Each page entry in the Physical Page Allocation Table is associated to one of the four pools based on which bank of memory it resides in. All the pages in a pool are linked together as a double linked list by setting the NextPage and PrevPage fields. The order is unimportant, but sequential is simplest. (It will soon get scrambled once the memory allocation has been running for a while.) The PrevPage field for the first entry in the double linked list and the NextPage field for the last entry can be set to any value as they are not used. Finally the HeadPhysicalPageAllocation and TailPhysicalPageAllocation registers for this memory pool are updated with first and last page numbers. Each memory pool is set up like this. (Any number of memory pools up to a maximum of four can be set up. Unused memory pools don't have any pages linked to them and must not be referenced in the Logical Texture Page Table.) The texture management hardware is now ready to be used once logical textures have been created. The texture management can be done on a global basis so all contexts/APIs share the same mechanisms, or can be done on a context by context basis.

Creating and Loading Texture Maps

The sequence of events when the application asks for a texture to be loaded are as is follows:

Host memory to hold the texture map is allocated and locked down. (Virtual host memory could be used, however the driver will need to respond to every page fault and make the textures available in locked physical memory before starting the DMA off to download them. Other than the extra run time overhead and setting the VirtualHostPage flag in the Logical Texture Page Table entries the rest of the operations are the same.) This memory is private to the driver or ICD and not accessible to the application. The pages do not need to be contiguous.

The logical pages to use for the texture map are allocated from the Logical Texture Page Table. These may be new pages or currently assigned. If they are currently assigned then the texture management hardware will do any necessary housekeeping to prevent aliasing of physical pages to the same logical page (thereby degrading the performance, however still function correctly).

The host physical page (or host virtual page when host virtual addressing is used) of each page reserved for the texture is found and the HostPage field in for each corresponding entry in the Logical Texture Page Table is updated with it.

The memory pool this texture is to be stored in is determined and each logical entry has its MemoryPool field set appropriately. (This, in general, is likely to be a difficult thing to determine as the usage of the texture maps is not available Ideally texture maps which will be used simultaneously should be in different pools, unless they can both fit into the same 4K page.)

The Length field for each logical entry will normally be set to 0×100 (i.e. 4096 bytes), however as an optimization if only part of the 4K page is used (must be the lower part) then the number of 128 bit words used can be used instead.

The application's texture is copied into the previously allocated host memory and during the copy the texture map is patched and aligned as required by setting the texture map will be invoked with. (It is impossible to do any patching or aligning on the fly as the page of texture is downloaded as the download mechanism has no knowledge of the dimensions of the texture map, its base address, layout or texel size.)

The preferred way to update the Logical Texture Page Table is to use the SetLogicalTexturePage and UpdateLogicalPageInfo commands. The SetLogicalTexturePage command takes the logical page to update in the least significant bits. The UpdateLogicalPageInfo command sets bits 0 . . . 31 to zero and updates bits 32 . . . 63 with the given data. The entry to update was set by SetLogicalTexturePage command and this is auto incremented after the update. All the necessary housekeeping is done.

Alternatively the Logical Texture Page Table can be edited by software by reading and/or writing it directly to the table in memory by using bypass memory accesses methods. In this case it is the software's responsibility to do the necessary housekeeping to remove any referenced to the updated logical pages in the Physical Page Allocation Table.

After this set up has been done the texture map can be bound and used. Note that the texture map (or pages of it) are not loaded until it actually used.

PreLoading Texture Maps

As mentioned above the texture map is only downloaded when it is used, but it is sometimes useful to ensure it is downloaded when it is created. This can be done by using the Load mode to load each logical page in the texture map. Alternatively when a texture map is bound (to a context) you may want to ensure it is resident at this time, rather than wait for a page fault. If the page is already resident then there is no need to load it (as the Load mode would do) so the Touch mode can be used instead. These can be done using the command TouchLogicalPages. This command has the following data fields:

| Bit No | Name | Description |
| --- | --- | --- |
| 0–15 | Page | This field set the first Logical Page to touch. |
| 16–29 | Count | This field holds the number of pages to touch. |
| 31–31 | Mode | This field is set to 3 to touch a page(s) or to 1 to load a page(s). |

As each page is touched the corresponding texture data is downloaded.

Editing Texture Maps

To edit the texture map (for example as part of a TexSubImage operation in OpenGL) the host's copy is edited. The texture management hardware is notified that the texture pages (if resident) are stale by using the command TouchLogicalPages to mark these pages as non resident. This command has the following data fields:

| Bit No | Name | Description |
| --- | --- | --- |
| 0–15 | Page | This field set the first Logical Page to mark as stale. |
| 16–29 | Count | This field holds the number of pages to mark as stale. |
| 30–31 | Mode | This field is set to 0 to mark the pages as stale (i.e. non resident). The primary texture cache is invalidated (using the InvalidateCache command) to ensure it doesn't hold any stale texel data for the texture map just edited. |

Deleting Texture Maps

There is no real need to delete texture maps as simply reusing the logical address achieves the same thing. If you really want to delete the pages then the TouchLogicalPages command can be used to mark them non resident. (Note that this doesn't mean that these pages are made the least recently used pages so they get reused sooner—they will percolate to this status subsequently just through inactivity.)

Locking Down Texture Maps

The best way to have locked down texture maps (i.e. they don't get swapped out) is to avoid using the logical/virtual management and have them as physical textures. If a texture is to be locked down after is has been created as a logical texture then the only way to do this is for the software to edit the Physical Page Allocation Table (and maybe the HeadPhysicalPageAllocation and/or TailPhysicalPageAllocation registers for the effected pools). Before these edits can be done the system must be in a quiescent state so no texture downloads are guaranteed to start.

Virtual Host Textures

Virtual host textures are textures which live in virtual host memory so do not need to be locked down into physical memory. As a result they are not guaranteed to be present when a corresponding page fault occurs, and in any case the Logical Texture Page Table only holds the virtual page address and not the physical page address.

The Logical Texture Page Table will have the Virtual-HostPage bit set for these logical pages and other than this the general setup (from RX's viewpoint) is the same as when the bit is clear.

On a page fault the DMA controller cannot go and fetch the page information directly but raises an interrupt.

On receiving this interrupt the TextureAddr PCI register is read and this holds the 20 bit virtual address page for the faulting texture page. (In P3 for P3 or in Gamma for RX; the one in RX should not be accessed as the software will not know which RX in a multi-RX system is being serviced).) When the data is available in locked memory the physical address where the data is located is written in to the TextureAddr PCI register. This will wake up the texture download DMA controller and it will do the download and finish any necessary house keeping.

Using Logical Mapping without Virtual Management

Logical texture mapping can be used without the virtual part so a texture map does not need to be stored in consecutive physical pages in memory, but the automatic loading of textures is never done. This allows textures to be managed in the same way they are on GLINT MX, but simplifies the memory management issues as the physical memory allocation is now done on page size chunks, rather than variable texture map sized chunks.

To work like this all current logical textures must be resident so a page fault will never occur. When a texture is created the software needs to do two things:

Allocated the physical memory and update the Logical Texture Page Table with the logical to physical mappings. The physical page for each corresponding logical page is stored in bits 0 . . . 15 and the resident bit (bit 16) is set. The second word in each entry will never be used as this is only accessed on a page fault.

The Logical Texture Page Table can be modified directly via the bypass (with the normal caveats on syncing first) or can be updated via the command stream. The DownloadAddress register and DownloadData commands (see FB Write Unit for details) can be used to update an arbitrary region of memory so can be used to update the logical entries in the Logical Texture Page Table. (The UpdateLogicalPageInfo command cannot be used as it zeros the physical page field and updates the fields concerned with page faults. Also this command does housekeeping work on the Physical Page Allocation Table, which presumably will not have been set up if the virtual texture management is not being used.)

The texture map must be downloaded in to the physical pages. This can be done via the bypass mechanisms or through the command stream. In either case it is the software's responsibility to do any patching and alignment consistent with how the texture map will be used. Note the texture download mechanism which can do the patching doesn't have any method of remapping the addresses so cannot work with non contiguous physical memory. The DownloadAddress register and DownloadData commands can be used to download each page of texture (pre-patched, if necessary) into its corresponding physical page.

Programming Notes for Host Textures

Texture maps stored in host memory can be managed by the virtual management hardware. This allows a texture map to be split over non contiguous pages of host memory (without relying on the AGP GART table to do the logical to physical mapping) and texture maps to be paged in and out of this memory.

The host pages are not part of the physical memory pool managed by the hardware so all host pages are allocated (or reallocated) by host software.

Start of Day Initialization

Assuming the range of logical pages reserved for host texture management is already included in the length of the Logical Page Table then no further initialization of RX is needed other than to set up the BasePageOfWorkingSetHost register with the address of the region to manage. This is a 256 MByte region and can be positioned anywhere in the 4G host address range.

No changes to the Physical Page Allocation Table are needed.

Creating Logical Texture Maps

The sequence of events when the application asks for a texture to be loaded are as follows:

Host memory to hold the texture map is allocated and locked down. (Virtual host memory could be used, however the driver will need to respond to every page fault and make the textures available in locked physical memory before starting the DMA off to download them. As these are AGP textures the length field (in the Logical Page Table) is zero so no download actually occurs, however it is convenient to use the same synchronisation methods in the hardware implementation. Other than the extra run time overhead and setting the VirtualHostPage flag in the Logical Texture Page Table entries the rest of the operations are the same.) This memory is private to the driver or ICD and not accessible to the application. The pages do not need to be contiguous.

The logical pages to use for the texture map are allocated from the Logical Texture Page Table. These may be new pages or currently assigned. If they are currently assigned then the TLB should be invalidated to prevent it from holding stale addresses.

Each logical page has its physical page, resident and host texture fields in the Logical Page Table updated with the corresponding host physical page where the texture is located. The length field must be set to zero (to disable a download from occurring). The pool field and the hostpage field are not used (but are available to software to hold information about this page).

The application's texture is copied into the previously allocated host memory and during the copy the texture map is patched and aligned as required by the setting the texture map will be invoked with.

The preferred way to update the Logical Texture Page Table is to use the DownloadAddress and DownloadData commands. The DownloadAddress command takes the byte address in memory of the Logical Page Table Entry to update. The DownloadData command writes its data to memory and then auto increments the address. Two words are written per logical page entry. After the Logical Page Table has been updated the TLB must be invalidated to prevent it holding stale data (use the InvalidateCache command with bit 2 set) and WaitForCompletion used to ensure the table in memory has been updated before any rendering can start. (The writes to the Logical Page Table are done via the Framebuffer Write Unit so may still be queued up on the subsequent TLB miss, hence stale page data will be read from the Logical Page Table. The WaitForCompletion command ensures this cannot happen.)

Alternatively the Logical Texture Page Table can be edited by software by reading and/or writing it directly to the table in memory by using bypass memory accesses methods. In this case it is the software's responsibility to Sync with the chip first to ensure no outstanding rendering is going to use a logical page about to be updated. The TLB still needs to be invalidated after the bypass updates have been done.

After this set up has been done the texture map can be bound and used.

PreLoading Texture Maps

This is not a meaning full operation with host textures (unless they are virtually managed in which case they can be touched like the non host textures can—see earlier) as the texels are read on demand and not downloaded as pages.

Editing Texture Maps

To edit the texture map (for example as part of a TexSubImage operation in OpenGL) the host's copy is edited. The primary texture cache is invalidated (using the InvalidateCache command) to ensure it doesn't hold any stale texel data for the texture map just edited.

Deleting Texture Maps

There is no real need to delete texture maps as simply reusing the logical address achieves the same thing.

Virtual Host Textures

Virtual host textures are textures which live in virtual host memory so do not need to be locked down into physical memory. As a result they are not guaranteed to be present when a corresponding page fault occurs, and in any case the Logical Texture Page Table only holds the virtual page address and not the physical page address.

The Logical Texture Page Table will have the VirtualHostPage bit set, the resident bit clear, the host texture bit set and length field zero for these logical pages.

The DMA controller will raise an interrupt (even though no download is needed the DMA controller is involved so the same software interface can be used).

On receiving this interrupt the TextureAddr, LogicalPage and TextureOperation PCI register are read (in P3 for P3 or in Gamma for RX—the one in RX should not be accessed as the software will not know which RX in a multi-RX system is being serviced) to identify the faulting texture page. When the data is available in locked memory the Logical Page Table is updated via the bypass and the TextureAddr PCI register is written (the data is not used). The write to the TextureAddr register will wake up the texture download DMA controller but because the length field is zero no download is done or physical page (from the Physical Page Allocation Table) allocated. The TLB will be automatically invalidated.

In servicing the interrupt a physical page (or pages if the interrupt is used to allocate a whole texture rather than just a page) must be allocated by software. If these physical pages are already assigned then the corresponding logical pages must be marked as non resident in the Logical Texture Page Table. If these newly non resident logical pages are subsequently accessed (maybe by a queued texture operation) they themselves will cause a page fault and be re assigned. Hence no knowledge of what textures are waiting in the DMA buffer to be used is necessary. The physical pages are allocated from the host working set whose base page is given by BaseOfWorkingSetHost register.

Special Types of Textures

3D Textures

A 3D texture map is one where the texels are indexed by a triplet of coordinates: (u, v, w) or (i, j, k) depending on the domain. Such textures are typically used for volumetric rendering.

The texture map is stored as a series of 2D slices. Each slice is stored in an identical fashion to all other 2D texture maps. The first slice (at k=0) is held at the address given by TextureBaseAddr0 and the remaining slices are held at integral multiples of TextrueMapSize (measured in texels) from TextureBaseAddr0.

3D texture mapping is in this unit is enabled by setting the Texture3D bit in TextureReadMode0 (the same bit in TextureReadMode1 is always ignored). The layout, texel size, texture type and width should be set up the same for texture 0 and texture 1.

When 3D texture is enabled then any bits to control dual textures or mip mapping are ignored.

The storage of 3D texture maps is not optimal for volumetric rendering—ideally the texture is stored in 3D patches (at the 2×2×2 level and at the 32×32×32 level, or equivalents). Some access paths (primarily along the k axis) will exhibit a high number of page breaks so be slower than paths primarily along the i or j axis. No effort has been made to address this as the inclusion of 3D textures is more a functional rather than a performance issue (yet!).

CombinedCache mode bit should not be set when 3D textures are being used.

Bitmaps

Bitmap data can be stored in memory and accessed via the texture mapping hardware. The resulting "texel" data is treated as a bitmap and used to modify the pixel or color mask used in a span operation.

The bitmap data can be held at 8, 16, 32 or 64 bit texels and is zero extended (when necessary) to 64 bits before being optionally byte swapped, optionally mirrored, optionally inverted and ANDed with the pixel mask or the color mask. The primary texture cache is not used for this data, however the secondary cache is.

The bitmap data can only be held in Linear or Patch64 layouts=Patch32_2 or Patch2 formats are not supported, however no interlocks prevent their use—the results are just not interesting or useful. The bitmap data can be stored as logical or physical textures.

The bitmap data can be held as packed 8, 16, 32 or 64 bit data, usually with one scanline of the glyph held per texel. Glyphs wider than 64 bits will take multiple texels to cover the width. Packing multiple scanlines together reduces the waste of memory (in MX the texel size was limited to 32 bits for spans), and makes the caching more efficient.

Before the texel can be used it is processed as follows:

The texel is zero extended up to 64 bits.

The texel is byte swapped according to TextureReadMode0.ByteSwap field. If the 64 bit word has bytes labelled: ABCDEFGH then the three bits swap the bytes as follows:

| Bit 2 (long swap) | Bit 1 (short swap) | Bit 0 (byte swap) | swapped ABCDEFGH |
|---|---|---|---|
| 0 | 0 | 0 | ABCDEFGH |
| 0 | 0 | 1 | BADCFEHG |
| 0 | 1 | 0 | CDABGHEF |
| 0 | 1 | 1 | ABDCEFGH |
| 1 | 0 | 0 | EFGHABCD |
| 1 | 0 | 1 | FEHGBACD |
| 1 | 1 | 0 | GHEFCDAB |
| 1 | 1 | 1 | HGFEDCBA |

Next the texel is optionally mirrored. This is controlled by the TextureReadMode0.Mirror bit. The mirror swaps bits:

(0,. 63), (1, 62), (2, 61) . . . (31, 32).

The texel is next optionally inverted under control of the TextureReadMode0.Invert bit.

When TextureReadMod0.OpaqueSpan is zero the texel is ANDed with the pixel mask to remove pixels from the mask. When TextureReadMode0.OpaqueSpan is one the texel is ANDed with the color mask (in the SpanColorMask message) to control foreground/background color section.

Windows normally supplies its bitmasks as a byte stream with successive bytes controlling 8 pixel groups at increasing x (i.e. towards the right edge). Bit 7 within a byte controls the left most pixel (for that group) and bit 0 the right most pixel. To match up the pixel mask order (bit 0 controls the left most pixel, bit 63 the right most pixel) the three byte swap bits are all set and the mirror bit set.

Indexed Textures

Indexed textures are a special case because they are stored as 8 bit texels and expand to 32 bit texels when loaded into the Texture Filter Unit (the expansion happened in the Texture LUT Unit). This makes the addressing and cache management slightly more complicated as the addressing uses the 8 bit texel size, while the cache management uses the 32 bit texel size.

The secondary cache holds the texture data in its 8 bit format so reduces the number of memory reads when the access path is mainly in u across the texture map.

YUV 422 Textures

YUV textures are a special case because two texels are stored in a 32 bit word (so in this sense they are 16 bit texels), however the U and V components are shared so the 32 bit word represents two 24 bits texels (the spare "alpha" byte is set to 255). If the input bytes in the 32 bit word are labelled:

Y1 V0 Y0 U0 (U0 in the ls byte)

then the two output words are formed (in the internal format):

255 V0 U0 Y0 and 255 V0 U0 Y1 (Y in the ls byte)

This arrangement of the YUV pixels in memory is called YVYU, but an alternative memory format (called VYUY) is also supported. In this case the bytes are labelled:

V0 Y1 U0 Y0 (Y0 in the ls byte)

Borders

Borders (in the OpenGL sense) are only used when the filter mode is bilinear and the wrapping mode is clamp. In this case when one of the filter points go outside the texture map the border texel is read (if present) or the border color is used (if absent). The border, if present, still needs to be skipped over and this will have already been done by incrementing the i, j indices before they get to this unit.

The width of a texture map is given by ($2^n$+2b) where b is 0 for no border or 1 with a border. Unfortunately it is not good enough to set the texture map width to this value as the lower resolution mip map levels will "divide out the border" as the width is divided by 2 for each successive level. The TextureMapWidth0 and TextureMapWidth1 registers hold the width of the texture map without the border (in bits 0 . . . 11) and if a border is present the border bit (bit 12) in TextureMapWidth0 or TextureMapWidth1) is set.

If a 1×1 texture map has a border then the 3×3 map is stored as a 4×4 map as shown:

| b0 | b1 | b2 |
| b3 | t0 | b4 |
| b5 | b6 | b7 |

| b0 | b1 | b2 | b2 |
| b0 | b1 | b2 | b3 |
| b3 | t0 | b2 | b4 |
| b5 | b6 | b7 | b7 |

Texels which fall into the border when no border is present are flagged by the Texture Index Unit so these texels are not checked in the cache and no texels read from memory. The T0BorderColor . . . T7BorderColor flags used for this purpose are also passed to the Texture Filter Unit where they select the BorderColor0 (T0 . . . T3) or BorderColor1 (T4 . . . T7) registers instead of the primary cache to provide the texture data. The BorderColor0 and BorderColor1 registers would normally be set the same value for OpenGL when mip mapping.

Figure 4A:
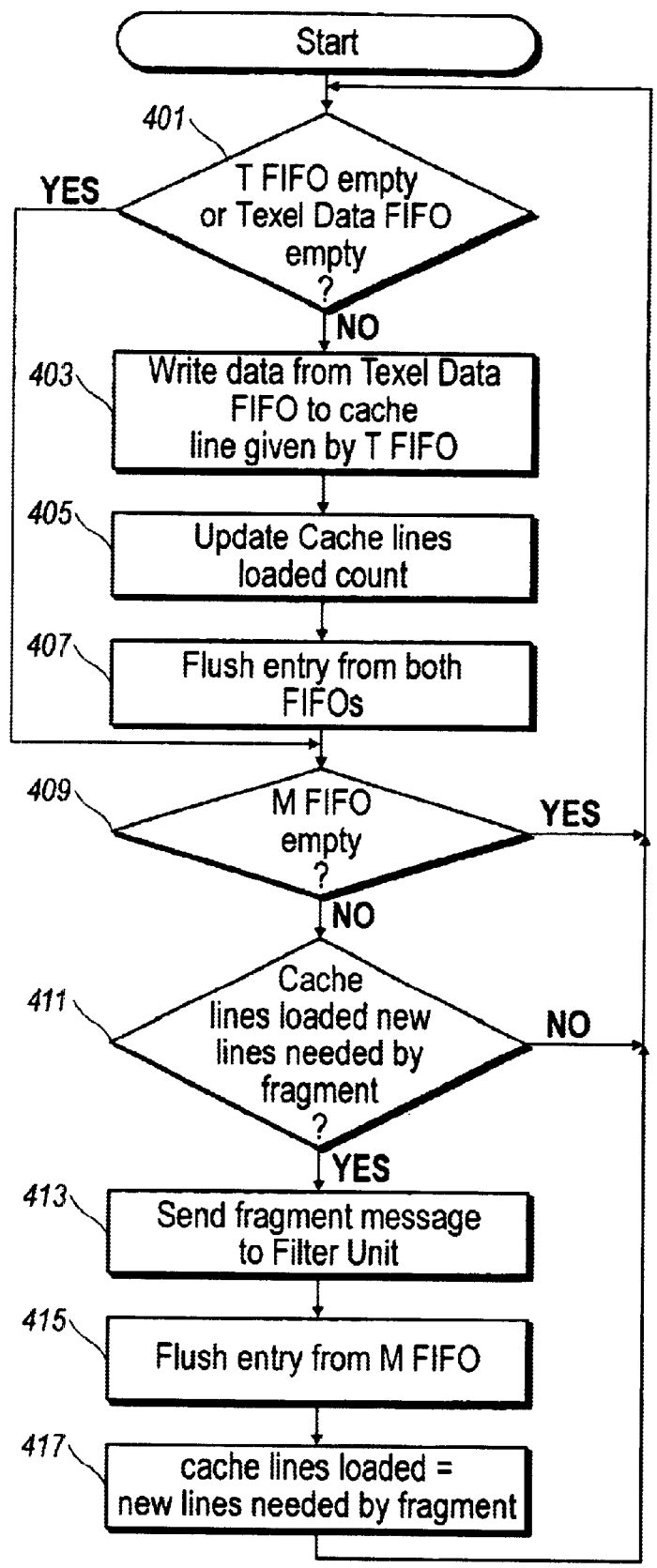
FIGS. 4A and 4B are a pair of flow charts which show how a texture is loaded, depending on whether a cache miss occurs.
Figure 4B:
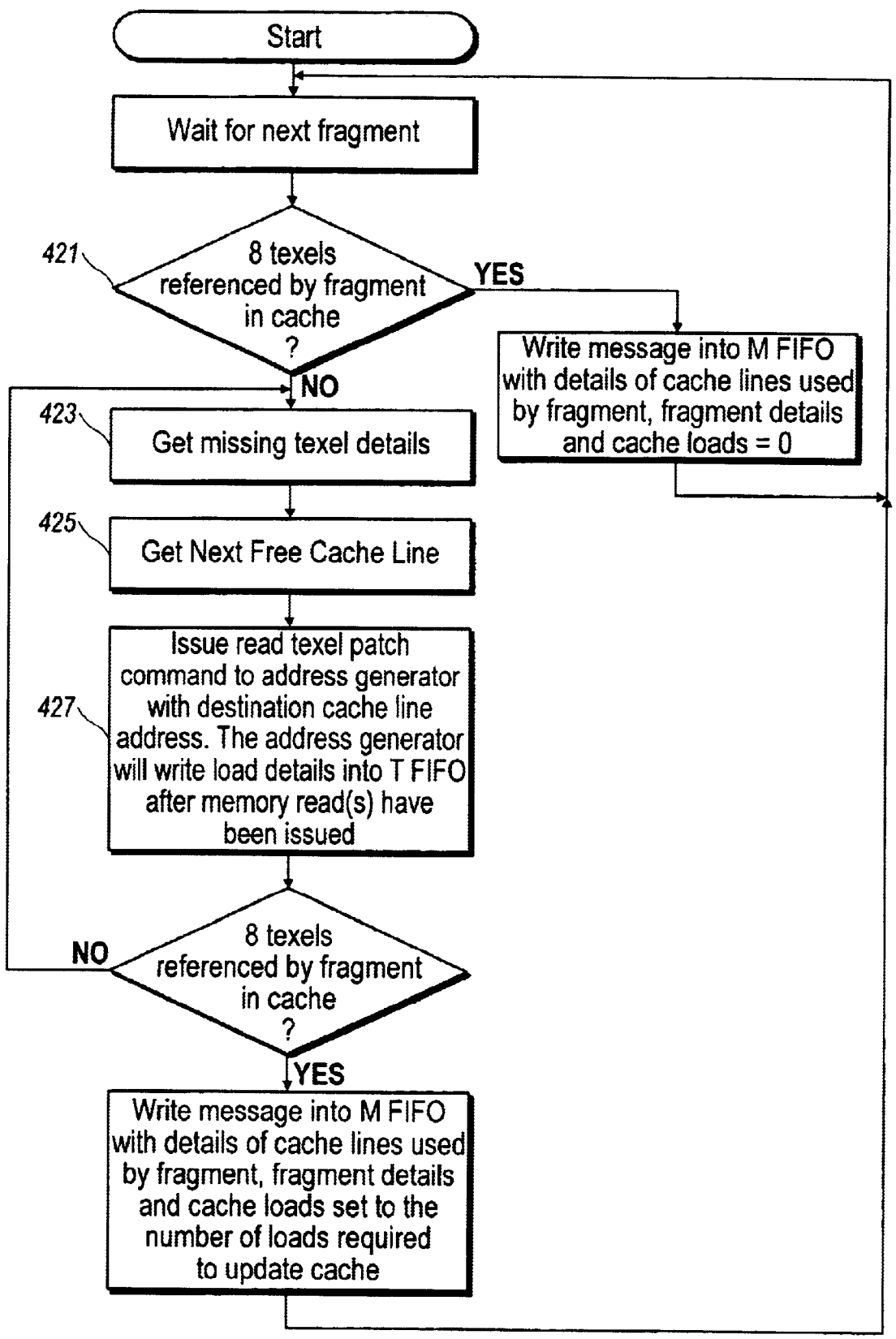

FIG. 4A and FIG. 4B are a pair of flow charts which show how a texture is loaded, depending on whether a cache miss occurs.

FIG. 4B shows actions in the Primary Cache Manager. If a cache miss occurs (test 421), the details of the missing texel are obtained (step 423), and the next free cache line is looked up (step 425). A read command is then issued to the address generator (step 427), specifying the free cache line as the return address. The address generator updates the T FIFO after the read request has occurred. A message is then written into the M FIFO with details of the cache lines used, fragment details, and the number (if any) of additional cache loads which have now occurred.

FIG. 4A shows actions in the Dispatcher. If the T FIFO or the Texel Data FIFO are not empty (test 401), then the data in the Texel Data FIFO is written (step 403) into the cache data line given by the T FIFO. The Cache lines loaded count is then updated (step 405), and the entry flushed from both FIFOs (step 407). Thereafter, if the M FIFO is not empty (test 409), and if the count of cache lines loaded indicates (test 411) that the cache would not be overfilled by the new cache lines, a fragment message is sent off (step 413) to the Filter Unit, and the active entry is flushed (step 415) from the M FIFO. The count of cache lines loaded is then adjusted (step 417) by the number of new lines needed.

Implementation

Following are some details of a sample implementation.

Overview

Figure 10:
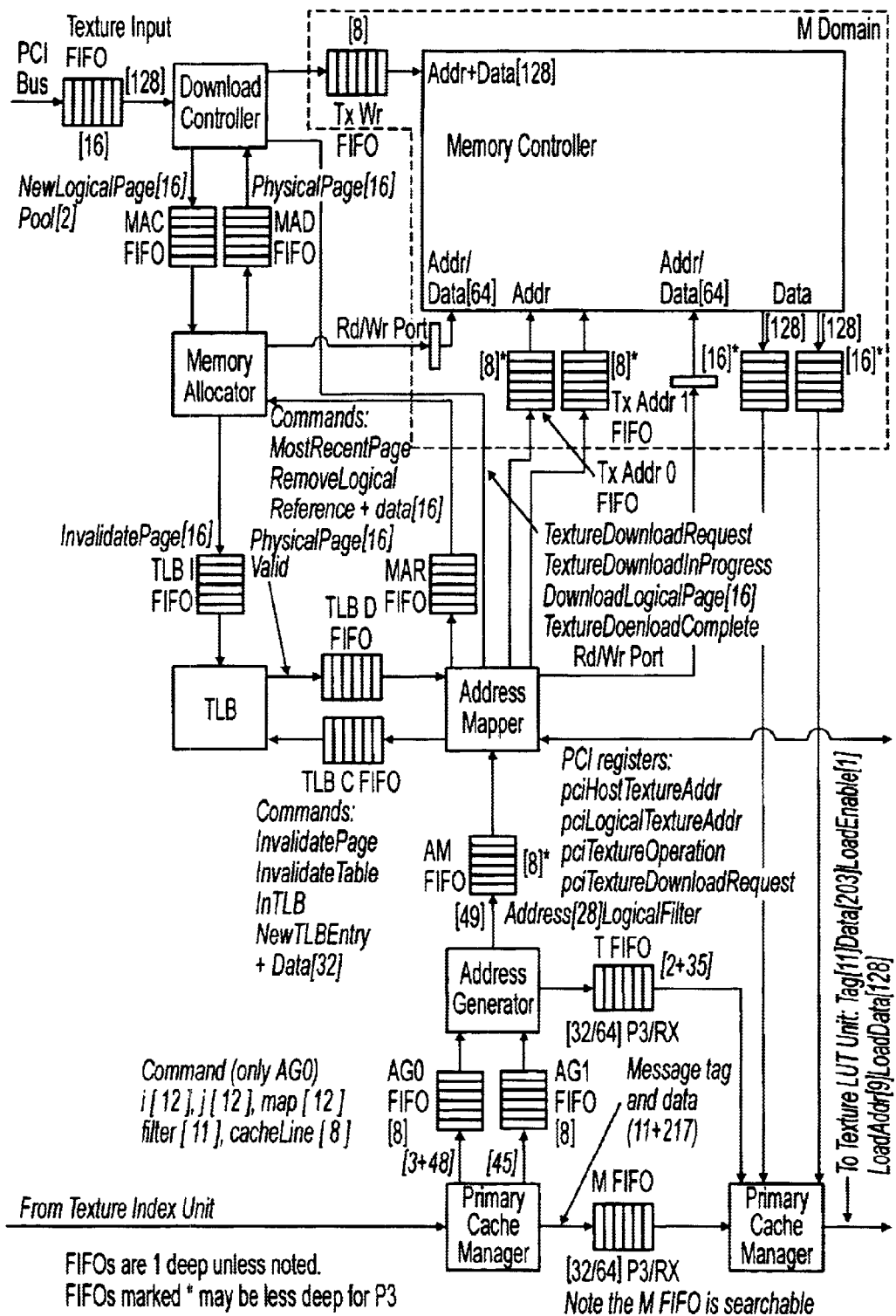
FIG. 10 shows a block diagram of the Texture Read Unit.

A block diagram of the unit is shown in FIG. 10. The overall unit is split into 7 sub-units and these are basically organized into three groups:

The Primary Cache Manager, Address Generator and Dispatcher form the core of the unit and work in a similar way to the other read units. The logical address translation is handled by the Address Mapper and TLB. The dynamic texture loading is handled by the Memory Allocater and the Download Controller.

The interfaces between all the units are shown as FIFOs, but most of the FIFOs are just a register with full/empty flags for simple handshaking. The single deep FIFOs have been used as they clearly delineate the functionality between units and allow a single sub unit to be responsible for a single resource.

The two shared resources which are managed in this way are the TLB and Memory Allocater. The TLB is mainly queried by the Address Mapper but the Memory Allocater needs to invalidate pages when a physical page is re-assigned. The Memory Allocater will allocate pages when requested by the Download Controller, but also needs to mark pages as "most recently used" when requested by the Address Mapper.

There are two read/write ports to the Memory Controller used to access the Logical Page Table and the Physical Page Allocation Table—these are 64 bit ports and are not FIFO buffered. There is no point in trying to queue up reads or writes on these ports as the texture process stalls until these operations are satisfied.

The read port to the Memory Controller is used to read texture data and has a deep address FIFO and return data FIFO to absorb latency.

The write port to the Memory Controller is used by the Download Controller to write texture data into memory during a download. The path from the Texture Input FIFO to the Memory Controller is 128 bits wide so the maximum download bandwidth can be sustained.

All the controlling registers (TextureReadMode, TextureMapWidth, TextureBaseAddr, etc. are all held in the Primary Cache Manager so the responsibility for loading them from the message stream, context dumping and readback is all concentrated in one place. This does mean that before any of them can be updated any outstanding work which may depend on them has to be allowed to complete. To make things simpler before any of these registers (see behavioral model for a full list) is updated the all the sub units need to be idle (as indicated by the FIFOs linking them be empty).

The sequence of events when a step message arrives under various conditions:

When All the Texel Data is in the Primary Cache

The texels: (i0, j0, map), (i1, j0, map), (i0, j1, map), (i1, j1, map) for texture 0 and for texture 1 are checked in parallel in the Primary Cache Manager to see if they are in the primary cache.

The step message, with the address of each texel filled in, is written to the M FIFO and the texel read count field on this step set to zero. This part of the processing all happens in the same cycle so the fragment throughput is maintained.

Some time later this step message reaches the Dispatcher and is passed on as soon as the following unit can accept it.

When Two Texels (from Different Texture Maps) are NOT in Primary Cache, but are in Physical Memory The texels: (i0, j0, map), (ii, j0, map), (i0, j1, map), (i1, j1, map) for texture 0 and for texture 1 are checked in parallel in the Primary Cache Manager to see if they are in the primary cache.

One texel from texture 0 and one texel from texture 1 miss the primary cache. The cache line allocation for both banks is checked simultaneously and the missing texels passed to the Address Generator via the AG0 and AG1 FIFOs for the corresponding banks. The step message, with the address of each texel filled in, is written to the M FIFO and the texel read count field on this step set to two. This part of the processing all happens in the same cycle so the fragment throughput is maintained.

The Address Generator will process the texel reads one at a time. It calculates the address for the texel in memory using the i, j and map values together with the appropriate TexelReadMode and TextrueMapWidth values. The address is checked to see if it is in the secondary cache, and if it is then instructions to load the primary cache from the secondary cache are sent down the T FIFO. A more common case (for Patch32_2 or Patch2 layout) is that the secondary cache doesn't hold the texel so the Address Mapper is given the address and its type (logical or physical) via the AM FIFO.

The Address Mapper checks in the TLB to see if the logical page is present and, if so, what its corresponding physical page is. The logical page is not in the TLB so the Address Mapper reads the entry in the Logical Texture Page Table for this logical page. The entry returns a resident bit and a physical page number. The resident bit is set so the physical page number is now known. The physical memory address is derived from the physical page and low order bits of the logical address and passed to the Memory Controller. The TLB is updated so this logical page is the most recent one and its corresponding physical page recorded. Some time later this step message reaches the Dispatcher and if the outstanding texel data (as shown by the texel read count field) has been loaded into the primary cache (in the Filter Unit) the step is passed on as soon as the following unit can accept it. If, however the outstanding texel data has not been loaded then the step message is stalled until it has.

When Two Texels (from Different Texture Maps) are not in Primary Cache NOR in Physical Memory The texels: (i0, j0, map), (i1, j0, map), (i0, j1, map), (i1, j1, map) for texture 0 and for texture 1 are checked in parallel in the Primary Cache Manager to see if they are in the primary cache.

One texel from texture 0 and one texel from texture 1 miss the primary cache. The cache line allocation for both banks is checked simultaneously and the missing texels passed to the Address Generator via the AG0 and AG1 FIFOs for the corresponding banks. The step message, with the address of each texel filled in, is written to the M FIFO and the texel read count field on this step set to two. This part of the processing all happens in the same cycle so the fragment throughput is maintained.

The Address Generator will process the texel reads one at a time. It calculates the address for the texel in memory using the i, j and map values together with the appropriate TexelReadMode and TextrueMapWidth values. The address is checked to see if it is in the secondary cache, and if it is then instructions to load the primary cache from the secondary cache are sent down the T FIFO. A more common case (for Patch32_2 or Patch2 layout) is that the secondary cache doesn't hold the texel so the Address Mapper is given the address and its type (logical or physical) via the AM FIFO.

The logical page is not in the TLB and the resident bit in the Logical Texture Page Table is clear so the Address Mapper writes to the host physical address (read from the page table) into the PCI HostTextureAddress register, the logical page into the PCI LogicalTexturePage register and the transfer length, memory pool and address type (set to host physical for this description) into the PCI TextureOperation register. Finally the PCI TextureDownloadRequest bit is set. The Address Mapper will wait for the Texture Download Complete signal to be asserted by the Download Controller.

Some time later the Texture DMA Controller (in Gamma for a RX system, or in P3 for a P3) will respond to the TextureDownloadRequest bit being set. It will write the logical address, transfer length and memory pool into the Texture Input FIFO and then follow this data with the page of texture map data.

The Download Controller on receiving the logical page and pool information in the Texture Input FIFO will make a request to the Memory Allocator via the MAC FIFO for the physical page to use for the download just about to start. The Memory Allocator will use the Physical Page Allocation Table to allocate a physical page and ask the TLB (via the TLB I FIFO) to invalidate the logical page previously occupying (if any) the newly allocated physical page. The Memory Allocator also updates the Logical Texture Page Table to mark the logical page as being resident at the new physical page. The physical page is returned back to the Download Controller via the MAD FIFO.

The Download Controller on receiving the physical page in the MAD FIFO will transfer the texture data in the Texture Input FIFO to the given physical page. Once this is done the TextureDownloadComplete signal is asserted which releases the Address Mapper to complete its task.

The Address Mapper will read the Logical Texture Page Table entry for this logical page and now that the page is resident the physical page is read from the Logical Texture Page Table. The physical memory address is derived from the physical page and low order bits of the logical address and passed to the Memory Controller. The TLB is updated so this logical page is the most recent one and its corresponding physical page recorded.

Some time later this step message reaches the Dispatcher and if the outstanding texel data (as shown by the texel read count field) has been loaded into the primary cache (in the Filter Unit) the step is passed on as soon as the following unit can accept it. If, however the outstanding texel data has not been loaded then the step message is stalled until it has.

Memory Interfaces

The Texture Read Unit has connections to four ports in the Memory Interface. The four ports are (in priority order from highest to lowest). This is an absolute priority and not based on any page break considerations:

Memory Allocator Port
Address Mapper Port
Texture Write Port
Texture Read Port

The following information is passed to the Memory Controller in a FIFO:

| Bit No. | Name | Width | Description |
| --- | --- | --- | --- |
| 0–1 | Type | 2 | Indicates what the target memory is. The options are:<br>0 = FB Memory<br>1 = LB Memory<br>2 = PCI |
| 2–29 | Addr | 28 | The read address of the 128 bits of memory data. |

The following information is passed back from the Memory Controller in a FIFO:

| Bit No. | Name | Width | Description |
| --- | --- | --- | --- |
| 0–127 | Data | 128 | The data read from the memory. |

Texture Write Port

This port is used by the Download Controller to write texture data into its allocated physical page. It is also used to update the Logical Texture Page Table to mark the page as being resident once it has been downloaded.

The following information is passed to the Memory Controller in a FIFO:

| Bit No. | Name | Width | Description |
| --- | --- | --- | --- |
| 0–1 | Type | 2 | Indicates what the target memory is. The options are:<br>0 = FB Memory<br>1 = LB Memory<br>2 = PCI |
| 2–29 | Addr | 28 | The write address of the 128 bits of memory data. |
| 30–45 | ByteEnables | 16 | A high on a bit enables that byte to be written. The 1s byte enable corresponds to data bits 0–7. |
| 46–173 | Data | 128 | The data to be written to the memory. |

The following information is passed back from the Memory Controller:

| Bit No. | Name | Width | Description |
| --- | --- | --- | --- |
| 0 | TrWrComplete | 1 | This signal is asserted by the memory controller when the FIFO is empty and all writes from this port, the Memory Allocator Port and the Address Mapper Port have been written to memory so can be read from another port. |

Note that the first two ports are not FIFO buffered, so they will block subsequent texture processing until their read or write request have been serviced.

Texture Read Port

This port is used to read texel data from memory. The addresses (after any necessary translation) are written into the Tx Addr FIFO and sometime later the 128 bits worth of data are returned via the Tx Data FIFO.

Memory Allocator Port

This port is used to update the Logical Texture Page Table with information from the host and to remove references from a physical page to a logical page in the Physical Page Allocation Table. The port is 64 bits wide (to save routing a 128 bit data bus from the Memory Controller). The read and write operations are buffered by a single level FIFO (to provide a simple interface) so will stall until their operations are satisfied.

The following signals are passed to the Memory Controller (MC):

| Bit No. | Name | Width | Description |
|---|---|---|---|
| 0–1 | Type | 2 | Indicates what the target memory is. The options are:<br>0 = FB Memory<br>1 = LB Memory<br>2 = PCI |
| 2 | Command | 1 | 0 = Write, 1 = Read |
| 3–31 | Addr | 29 | The write address of the 64 bits of memory data. |
| 32–39 | ByteEnables | 8 | A high on a bit enables that byte to be written. The 1s byte enable corresponds to data bits 0–7. |
| 40–103 | WrData | 64 | The data to be written to the memory. |

The following signals are passed from the Memory Controller (MC):

| Bit No. | Name | Width | Description |
|---|---|---|---|
| 0 | RdData | 64 | The data read from memory |

Address Mapper Port

This port is used to update the Physical Page Allocation Table as pages are allocated or made the most recent accessed page. It is also used to mark logical pages in the Logical Page Table as non resident when the associated physical page is re-used. The port is 64 bits wide (to save routing a 128 bit data bus from the Memory Controller). The read and write operations are buffered by a single level FIFO (to provide a simple interface) so will stall until their operations are satisfied.

The following signals are passed to the Memory Controller (MC):

| Bit No. | Name | Width | Description |
|---|---|---|---|
| 0–1 | Type | 2 | Indicates what the target memory is. The options are:<br>0 = FB Memory<br>1 = LB Memory<br>2 = PCI |
| 2 | Command | 1 | 0 = Write, 1 = Read |
| 3–31 | Addr | 29 | The write address of the 64 bits of memory data. |
| 32–39 | ByteEnables | 8 | A high on a bit enables that byte to be written. The 1s byte enable corresponds to data bits 0–7 |
| 40–103 | WrData | 64 | The data to be written to the memory. |

The following signals are passed from the Memory Controller (MC):

| Bit No. | Name | Width | Description |
|---|---|---|---|
| 0 | RdData | 64 | The data read from memory |

Interface with Texture Index and Texture Filter Units

This unit receives a substantial amount of information about the filtering process and the texels taking part in it from the Texture Index Unit. Some of this information (such as the interpolation coefficients) are not used by this unit and are just passed through. The active step messages and the span step messages are extended to carry the extra information. The following table describes the format of these messages:

| BitNo | Name | Description |
|---|---|---|
| 0–95 | — | These bits carry the normal data present in an ActiveStepX, ActiveStepYDomEdge, SpanStepX or SpanStepYDomEdge message. |
| 96–107 | f0i0 | This field holds i0 index for texture 0, even mip maps or even slices for 3D textures. The least significant bit of the computed index is not needed so the original 12 bit number has been reduced to 11 bits. |
| 108–119 | f)i1 | This field holds i1 index for texture 0, even mip maps or even slices for 3D textures. The least significant bit of the computed index is not needed so the original 12 bit number has been reduced to 11 bits. |
| 120–131 | f0j0 | This field holds j0 index for texture 0, even mip maps or even slices for 3D textures. The least significant bit of the computed index is not needed so the original 12 bit number has been reduced to 11 bits. |
| 132–143 | f0j1 | This field holds j1 index for texture 0, even mip maps or even slices for 3D textures. The least significant bit of the computed index is not needed so the original 12 bit number has been reduced to 11 bits. |
| 144 | T0Valid | These bits show which texels are valid texels as a function of the filter type and the |
| 145 | T1Valid | map type (1D or 2D) and will limit the addresses checked in the primary cache and |
| 146 | T2Valid | hence any texture reads ultimately done. |
| 147 | T3Valid | |
| 148 | T0BorderColor | These bits show which texels are to use the border color instead of texel data. |
| 149 | T1BorderColor | These are only taken into account for valid combinations of indices (see previous |
| 150 | T2BorderColor | field). |
| 151 | T3BorderColor | |
| 152–155 | f0map | This field holds the map level the texels (T0 . . . T3) are on. |
| 156–167 | f1i0 | This field holds i0 index for texture 1, odd mip maps or odd slices for 3D textures. The least significant bit of the computed index is not needed so the original 12 bit number has been reduced to 11 bits. |
| 168–179 | f1i1 | This field holds i1 index for texture 1, odd mip maps or odd slices for 3D textures. The least significant bit of the computed index is not needed so the original 12 bit number has been reduced to 11 bits. |
| 180–191 | f1j0 | This field holds j0 index for texture 1, odd mip maps or odd slices for 3D textures. The least significant bit of the computed index is not needed so the original 12 bit number has been reduced to 11 bits. |
| 192–203 | f1j1 | This field holds j1 index for texture 1, odd mip maps or odd slices for 3D textures. The least significant bit of the computed index is not needed so the original 12 bit number has been reduced to 11 bits. |
| 204 | T4Valid | These bits show which texels are valid texels as a function of the filter type and the |
| 205 | T5Valid | map type (1D or 2D) and will limit the addresses checked in the primary cache and |
| 206 | T6Valid | hence any texture reads ultimately done. |
| 207 | T7Valid | |
| 208 | T0BorderColor | These bits show which texels are to use the border color instead of texel data. |
| 209 | T1BorderColor | These are only taken into account for valid combinations of indices (see previous |
| 210 | T2BorderColor | field). |
| 211 | T3BorderColor | |
| 212–215 | f1map | This field holds the map level (T4–T7) are on. |
| 216–224 | I0 | Interpolation coefficient between (T0, T1) and (T2, T3) in 1.8 unsigned fixed point format. |
| 225–233 | I1 | Interpolation coefficient between (T0, T2) and (T1, T3) in 1.8 unsigned fixed point format. |
| 234–242 | I2 | Interpolation coefficient between (T4, T5) and (T6, T7) in 1.8 unsigned fixed point format. |
| 243–251 | I3 | Interpolation coefficient between (T4, T6) and (T5, T7) in 1.8 unsigned fixed point format. |
| 252–260 | I4 | Interpolation coefficient between (T0, T1, T2, T3) and (T4, T5, T7, T7) in 1.8 unsigned fixed point format. |

The active step messages are extended to carry the extra information. The following table describes the format of these messages:

| BitNo | Name | Description |
|---|---|---|
| 1–70 | — | These bits carry the normal data present in an ActiveStepX, ActiveStepYDomEdge message. |
| 71–80 | A0 also called cacheLine0 | This field identifies the cache line (bits 2–9) T0 is in and the byte position in the word (bits 0–1). |
| 81–90 | A1 also called cacheLine1 | This field identifies the cache line (bits 2–9) T1 is in and the byte position in the word (bits 0–1). |
| 91–100 | A2 also called cacheLine2 | This field identifies the cache line (bits 2–9) T2 is in and the byte position in the word (bits 0–1). |
| 101–110 | A3 also called cacheLine3 | This field identifies the cache line (bits 2–9) T3 is in and the byte position in the word (bits 0–1). |

| BitNo | Name | Description |
|---|---|---|
| 111–120 | A4 also called cacheLine4 | This field identifies the cache line (bits 2–9) T4 is in and the byte position in the word (bits 0–1). |
| 121–130 | A5 also called cacheLine5 | This field identifies the cache line (bits 2–9) T5 is in and the byte position in the word (bits 0–1). |
| 131–140 | A6 also called cacheLine6 | This field identifies the cache line (bits 2–9) T6 is in and the byte position in the word (bits 0–1). |
| 141–150 | A7 also called cacheLine7 | This field identifies the cache line (bits 2–9) T7 is in and the byte position in the word (bits 0–1). |
| 151–159 | I0 | Interpolation coefficient between (T0, T1) and (T2, T3) in 1.8 unsigned fixed point format. |
| 160–168 | I1 | Interpolation coefficient between (T0, T2) and (T1, T3) in 1.8 unsigned fixed point format. |
| 169–177 | I2 | Interpolation coefficient between (T4, T5) and (T6, T7) in 1.8 unsigned fixed point format. |
| 178–186 | I3 | Interpolation coefficient between (T4, T6) and (T5, T7) in 1.8 unsigned fixed point format. |
| 187–195 | I4 | Interpolation coefficient between (T0, T1, T2, T3) and (T4, T5, T7, T7) in 1.8 unsigned fixed point format. |
| 196 | T0BorderColor | These bits select which texels are to use the border color registers (one per bank) instead of the texel from the register file. T4BorderColor–T7BorderColor are also used when in combined cache mode to select between the register files for each texel |
| 197 | T1BorderColor | |
| 198 | T2BorderColor | |
| 199 | T3BorderColor | |
| 200 | T4BorderColor | |
| 201 | T5BorderColor | |
| 202 | T6BorderColor | |
| 203 | T7BorderColor | |
| 204–206 | texelReadCount0 | This field tells the Dispatch sub unit how many texel reads this step needs from Tx Data 0 FIFO and prevents the message being forwarded on if insufficient data has been loaded into the cache from this FIFO and Tx Data1 FIFO. This is used internally and not passed on to the next unit. |
| 207–209 | texelReadCount1 | This field tells the Dispatch sub unit how many texel reads this step needs from Tx Data 1 FIFO and prevents the message being forwarded on if insufficient data has been loaded into the cache from this FIFO and Tx Data0 FIFO. This is used internally and not passed on to the next unit. |
| 210 | texelNeeded0 | These bits (also called cacheLineValid) are set when the cacheLine0 to cacheLine7 fields hold valid values and qualify the search operation when checking if the replacement cacheLine is in use. These are used internally and not passed on to the next unit. |
| 211 | texelNeeded1 | |
| 212 | texelNeeded2 | |
| 213 | texelNeeded3 | |
| 214 | texelNeeded4 | |
| 215 | texelNeeded5 | |
| 216 | texelNeeded6 | |
| 217 | texelNeeded7 | |

Primary Cache Manager

The Primary Cache Manager is the interface point for the message stream and is responsible for the loading, readback and context switching of all the programmable registers in this unit. The registers are not loaded immediately a message is received as outstanding work queued up in the many FIFOs may depend on the current register values. Before the register is loaded all sub units must be idle (as indicated by all the FIFOs being empty.

The goal of this sub unit is to process a step message in a single cycle when all the required texels are in the primary cache or when there is one miss from each bank of the cache. If one bank gets two or more misses then an extra cycle can be taken to process each miss that results in a new texel read. A read may clear multiple misses so these extra misses don't cost any extra cycles.

The remainder of the sub units can only process one read at a time so if several successive steps cause two misses (one from each bank) the primary cache manager will eventually stall when the AG0 and AG1 FIFOs become full. This is not expected to be a frequent occurrence, except maybe at the start of a new primitive. Multiple cache line loads (in the Texture Filter Unit) will happen sequentially, but the expedited loading mechanism may allow these to be hidden under earlier step (or other) messages, providing the memory latency is less than the number of queued items in the M FIFO.

The main component in the Primary Cache Manager is the Cache Directory (one per bank). Block diagrams of this will be given as a significant number of gates are involved in these parts. Note these diagrams only show the major data paths and omit clocks, etc.

Figure 11:
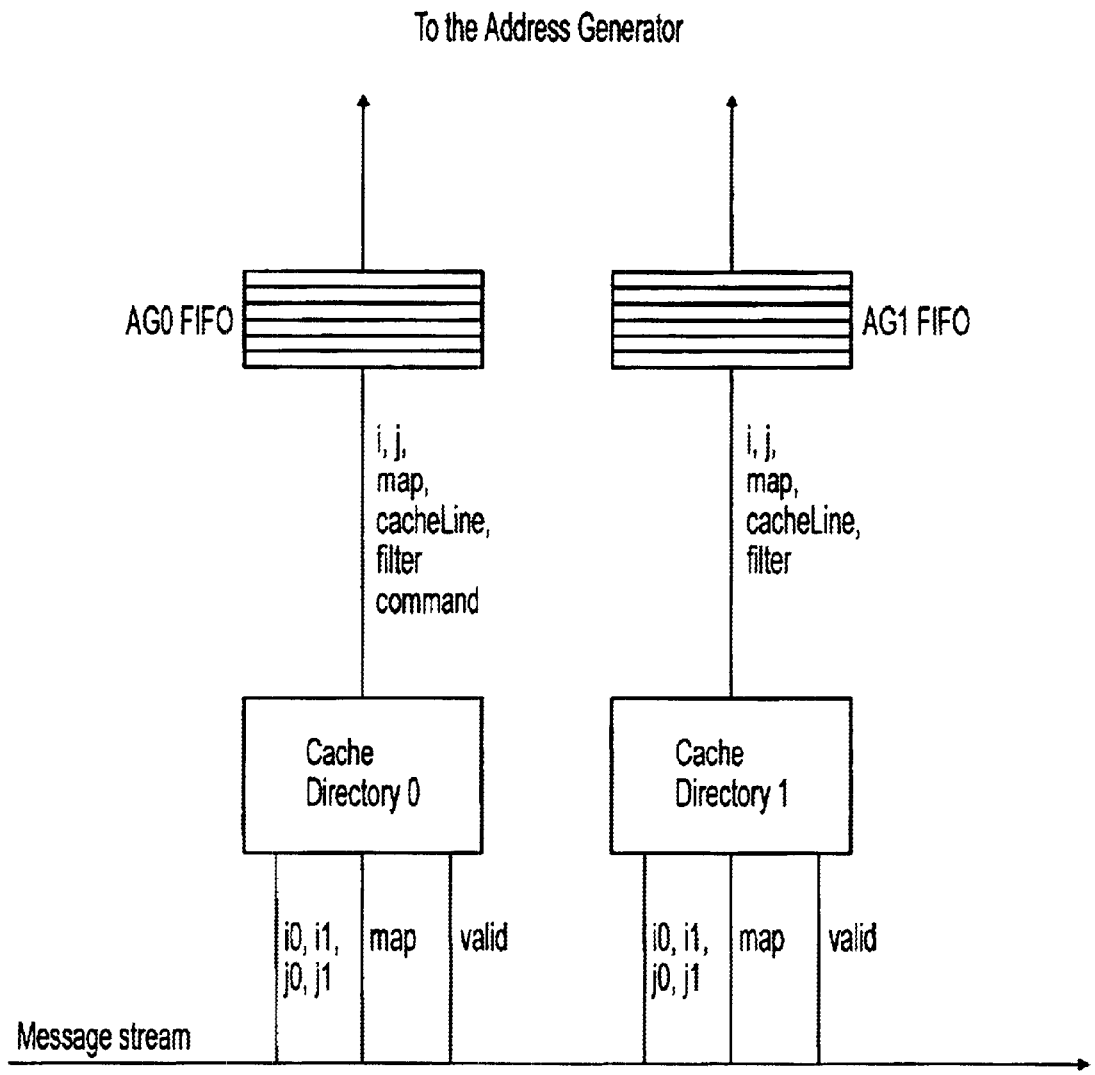
FIG. 11 shows a block diagram of the Primary Cache Manager.

The overall block diagram is shown in FIG. 11.

Figure 12:
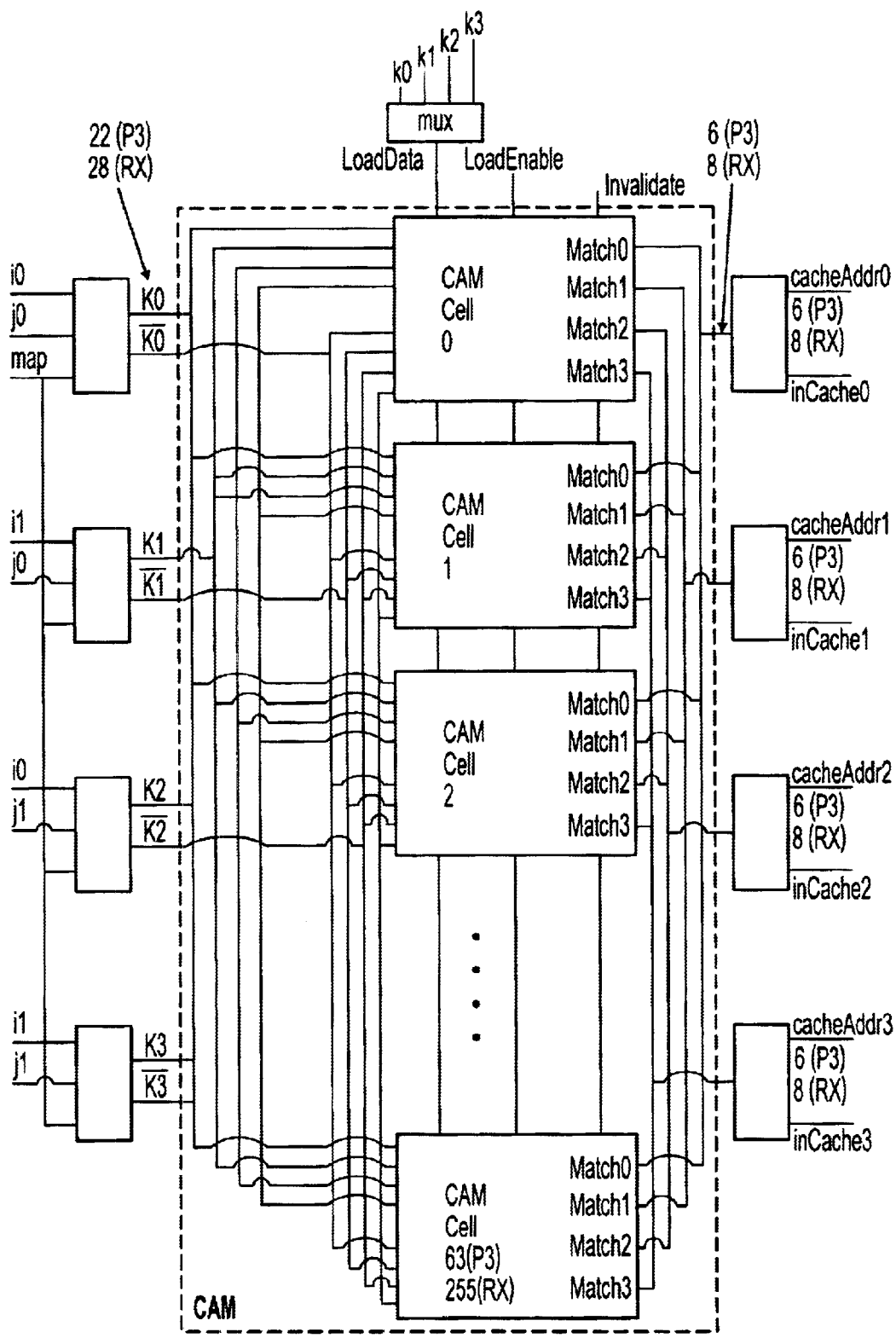
FIG. 12 shows a block diagram of the Cache Directory.

The cache directory block diagram is shown in FIG. 12. Note the complementary key outputs are only used to reduce the cost of the comparators in the CAM cells.

Figure 13:
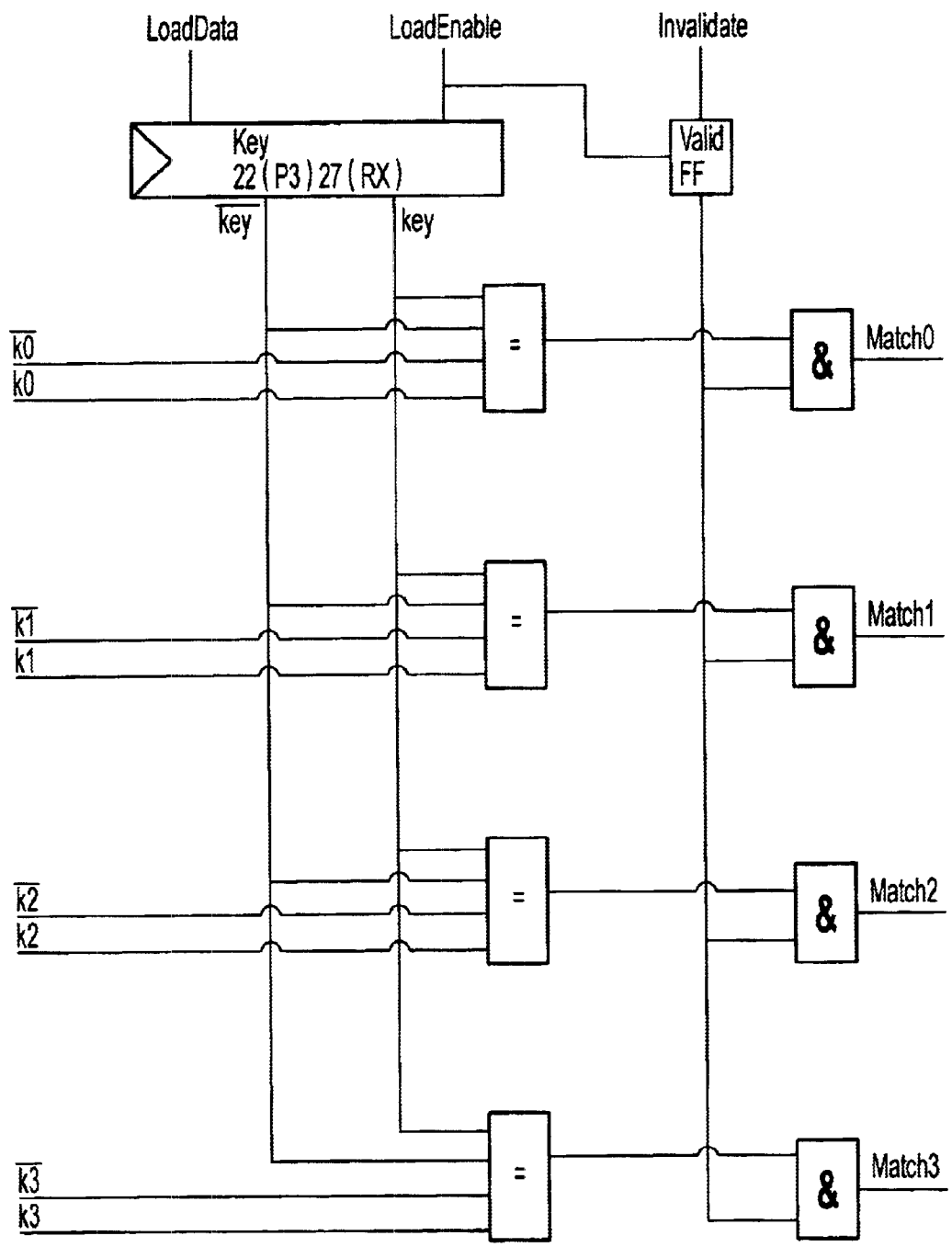
FIG. 13 shows a block diagram of the CAM Cell.

The CAM Cell block diagram is seen in FIG. 13. The cache directory can only ever report a maximum of one match per given key.

Address Generator

The Address Generator is presented with one or two texels (via the AG0 and AG1 FIFOs) which need to be read. It processes the read requests serially starting with filter 0 (if present) and calculates the address of the memory word(s) containing the 2×2 patch of texel data the read texel is in.

The secondary cache is checked to see if the memory address has already been read and if not the address, a logical/physical flag and the filter number is passed over to the Address Mapper and control information inserted into the T FIFO to load the secondary cache line with the new texel data and to dispatch the texel data to the Filter Unit.

If the texture map layout is Linear or Patch64 then two or four reads will be necessary to build up the 2×2 patch of texel data the Texture Filter Unit is expecting.

The secondary cache is 4 entries deep and the cache line length matches the memory width so is 128 bits. The cache is direct mapped so the search and replacement policies are very simple. The cache is mainly intended to help when the layout is Linear or Patch64, but is also useful for bitmask operations (i.e. with spans) and 8 bit indexed texture maps.

The cache can hold a logical or a physical address so a flag identifies the address type to prevent unwanted aliasing from occurring.

The cache line is formed from the least significant bit of j and the filter bank for all cases except bitmasks (i.e. span operations). For span operations the mapping is to take 2 bits out of the i index (adjusted for the texel size) on the assumption that the j index will normally be zero.

The address calculation follows the normal methods using in the Framebuffer Read Unit and Framebuffer Write Unit with a few small additions:

- The width of the texture map needs to be reduced as a function of the map level when mip mapping. This width is clamped (as a function of texel size) for the Patch32_2 and Patch2 layouts to conform to the layout rules.
- The base address for the texture map is taken from one of the TextureBaseAddr registers as a function of map level, map base level and map max level values held in the corresponding (to the filter) TextureReadMode register.
- The Patch32_2 layout will be changed to Patch2 layout when the texture map width falls below 128 bytes.
- Three-D textures have the slice offset (held in TextureMapSize register) factored in to the address calculation.
- The borders are added in (if present) separately to the width calculation so they don't get divided out due to mip mapping.

Address Mapper

The Address Mappers main job is to map logical addresses to physical addresses. Physical addresses pass straight through with no further processing.

Physical addresses are passed to the Memory Controller via two FIFOs. There is one FIFO per filter bank (the filter bank an address corresponds to is passed in the AM FIFO along with the address and logical flag). The two FIFOs keep the addresses from one texture map separate from the addresses from the other texture map. For dual textures (unlike mip maps) it is not possible to ensure they are allocated into different banks of memory, hence they may try and share the same page detector in the Memory Controller. If the two texture map addresses are interleaved then we could get the sequence: page break, read texel from map 0, page break, read texel from map 1, etc. This high ratio of page breaks is very detrimental to achieving good memory performance. By directing the two streams of addresses into their own FIFOs the Memory Controller is able to group reads from one texture map together, thereby amortising the page break costs over more texel reads.

Most of the work in mapping the logical page to a physical page is done in the TLB sub unit and for the majority of mapping requests the TLB will hold the corresponding physical page so after merging the physical page and low order bits of the logical address the physical address is passed to the Memory Controller.

When the TLB misses, the memory is read (via a separate 64 bit port) to look up the logical page entry in the Logical Texture Page Table. If the page is resident the physical address is formed, passed to the Memory Controller and the TLB given the logical page and its physical mapping to insert as the most recently accessed page.

When the logical page is not resident the pciHostTexturePage, pciLogicalTexturePage, pciTextureOperation PCI registers are updated for the faulting page.

If the Download Controller is not currently downloading this logical page the pciTextureDownloadRequest bit set, which will inform the Texture DMA Controller (in Gamma for RX, or internal to P3) a transfer is needed. (There may be a race condition here where the Address Mapper fails to notice the page just downloaded is the one it wants and requests it again. This is a safe thing to do, but will waste a small amount of bandwidth.) The Download Controller will clear pciTextureDownloadRequest at the start of the transfer of this page.

If the Download Controller is currently downloading this logical page the pciTextureDownloadRequest bit is not set because the Texture DMA Controller is already satisfying the request.

The Address Mapper asserts TextureDownloadRequest to the DownloadController and waits for the texture to be downloaded (as indicated by TextureDownloadComplete being asserted), re-reads the Logical Texture Page Table. The physical address is now formed, passed to the Memory Controller and the TLB given the logical page and its physical mapping to insert as the most recently accessed page.

This sub unit stalls until the texture page has been downloaded and the Logical Texture Page Table updated. See the Download Controller for a description of the interface signals between the two sub units.

Communication with the TLB is shown via FIFOs for simplicity and to allow a second source (the Memory Allocator) to invalidate entries in the TLB. (This may happen asynchronously because, in an RX system, a texture download may be initiated by another RX.)

Translation Look Aside Buffer (TLB)

The TLB responds to two command streams (serviced in round robin order):

- The Memory Allocator will request a logical page be invalidated if it is present. This will be a comparatively rare operation as it will occur once per download. In theory the logical page which is being invalidates should not be in the TLB as normally there are many more pages in the working set than TLB entries. Consequently the TLB holds the set of most recent pages while the page allocated is the least recently used one and they should not overlap. (It is possible to make them overlap by setting the working set to fewer pages than TLB entries or by doing many externally initiated texture downloads.)
- The Address Mapper checks if the logical to physical page mapping is already known before it takes the slower route of reading the Logical Texture Page Table. The TLB is fully associative and can provide the physical page (if present) in a single cycle (maybe pipelined). The update time can take longer if necessary as this will only occur after a Logical Texture Page Table read.

Figure 14:
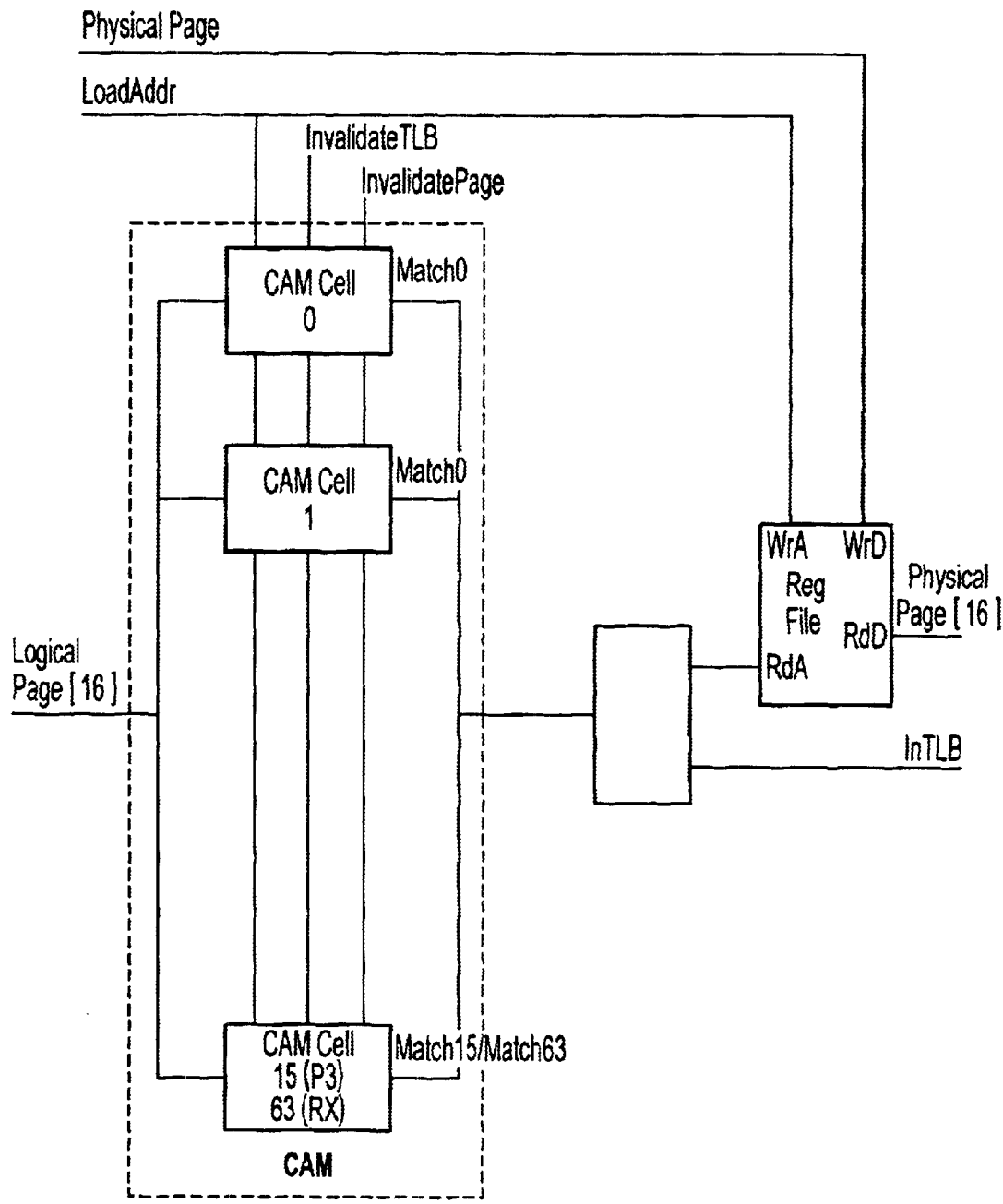
FIG. 14 shows a block diagram of the Translation Look aside Buffer (TLB).
Figure 15:
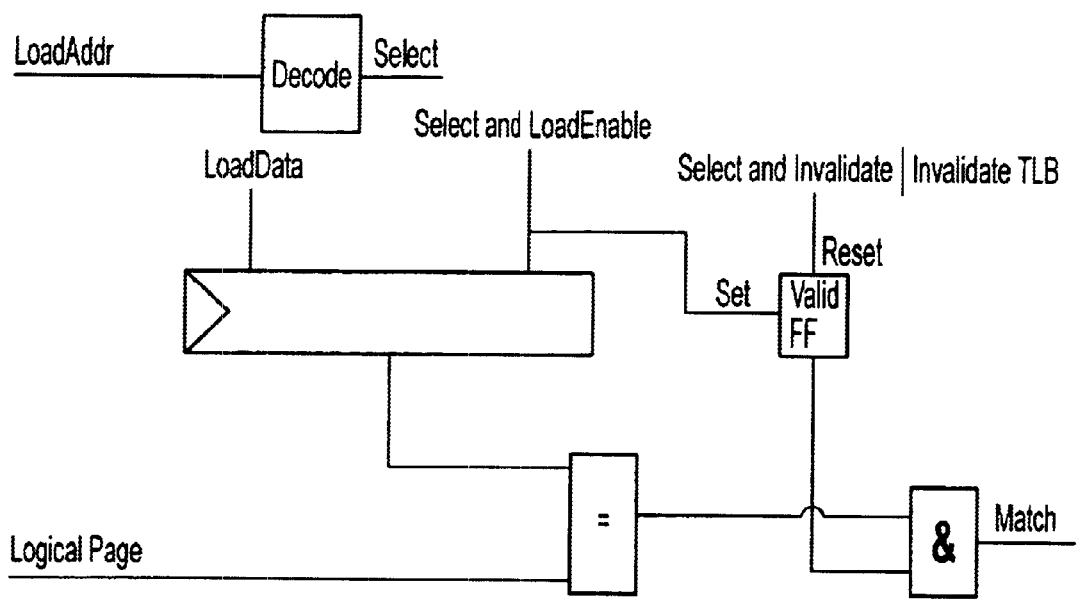
FIG. 15 shows a block diagram of an individual CAM cell.

The TLB holds 16 entries for P3 and 64 entries for RX. The block diagram of the TLB is seen in FIG. 14. The block diagram of an individual CAM cell is shown in FIG. 15.

An alternative arrangement is to hold the physical page as an extension to the register already holding the logical page and use the match signal from a CAM cell to gate the physical page into an or-array. This will be faster, but the storage of the physical page information will be less efficient than in a register file.

The TLB can only ever report a maximum of one match for a given logical page

Memory Allocater

The Memory Allocator responds to two command streams (serviced in round robin order):

- The Download Controller asks for a physical page at the start of a new texture download. This is passed in the MAC FIFO and the tail page for the requested memory pool is allocated. The Physical Page Allocation Table is updated (via a private memory port) to move the tail page to the head of the pool. The previous logical page assigned to the allocated physical page is marked as non resident in the Logical Texture Page Table and invalidated in the TLB. The physical page is returned to the Download Controller via the MAD FIFO.

The Address Mapper, when there is a TLB miss will ask for the physical page the logical page is mapped to be become the most recently used page in its pool (i.e. it is moved to the head).

Download Controller

The Download Controller waits for the Texture Input FIFO to go not empty and then reads the first word to find out about the texture which is just about to be received. It asks the Memory Allocator, via the MAC FIFO for a suitable physical page and once it has received this (via the MAD FIFO) it will copy the texture data into the memory. If the logical page number of the texture matches up with the one the Address Mapper was waiting for (shown by the TextureDownloadRequest and pciLogicalTexturePage) the Address Mapper is notified it can continue by the TextureDownloadComplete signal and TextureDownloadRequest is cleared.

The Download Controller moved 128 bits of data at a time so the download bandwidth can cope with AGP 4X systems (the download bandwidth will be greater than 1 GByte per second). This sub unit interacts with the Address Mapper via the following signals:

Texture DMA Controller

When a texture page fault occurs the Texture Read Unit interfaces with a Texture DMA Controller to actually get the data. This DMA Controller is in Gamma for a RX based system, or in P3 for a P3 system.

The P3 Texture DMA Controller just handles a single request at a time. The Gamma based Texture DMA Controller is monitoring multiple RXs and broadcasts the texture data to all RXs and not just the requesting one.

The following hardware signals are used to communicate between the Texture Read Unit and the Texture DMA Controller (each RX will provide its own pair of signals and a mechanism to allow the texture data to be broadcast to all RXs simultaneously):

pciTextureDownloadRequest. This signal is asserted by Texture Read Unit to request a texture download. It is de-asserted once the texture download has started.

TextureFIFOFull. This signal is asserted by the Texture Read Unit when it is not able to accept any more data being written into the TextureInput FIFO.

When the Texture DMA Controller has detected a download request it reads three PCI registers from the requester. These registers are:

HostTexturePage. This register holds the host page (in bits 0 . . . 19) where the texture resides. This is either a physical page or a virtual page. A bit in the TextureOperation register identifies the type of page. If the page is a virtual page then an interrupt is generated and the host will read the page and initiate the DMA once

| Name | Width | Description |
|---|---|---|
| pciTextureDownloadRequest | 1 | This is asserted by the Address Mapper when it hits a page fault and needs a texture page downloaded and that page is not currently being downloaded (the download was instigated by another RX). This is cleared by the Download Controller. This signal tells the Texture Download Controller (in Gamma for RX or internal to P3) a download is needed. |
| pciLogicalTexturePage | 16 | This is set by the Address Mapper to show what logical page it is requesting. |
| TextureDownloadRequest | 1 | This is assetted by the Address Mapper when it hits a page fault and needs a texture page downloaded. This is cleared by the Download Controller when this page has been downloaded and the Logical Texture Page Table updated. This signal tells the Download Controller the pciLogicalTexturePage register holds a valid page number so it can inform the Address Mapper the download is complete (assuming the page matches). |
| TextureDownloadInProgress | 1 | This is asserted by the Download Controller and is used to validate the DownloadLogicalPage value. The Address Mapper uses this to check if the download it wants is currently being done. |
| DownloadLogicalPage | 16 | This is set by the Download Controller to identify the logical page it is in the process of downloading. |
| TextureDownloadComplete | 1 | This is asserted by the Download Controller when it has finished downloading the texture the Address Mapper is waiting on. |

Dispatcher

The Dispatcher holds the data part of the secondary cache and forwards texel data to the primary cache (in the Filter Unit). Texel data is allowed to flow through whenever it arrives from the Memory Controller, but under control from commands received via the T FIFO. A count of the texel data loaded for each filter bank (i.e. texture map) is maintained so that an active step message can be delayed until all the texel data it requires is present in the Filter Unit. In normal operation this delay should not be invoked very often.

The Dispatcher also handles span processing. This involves zero extending the texel data to a 64 bit bitmask, byte swapping, mirroring and inverting when necessary and finally anding the pixel mask in the span step message.

the data has been made available. The conversion from page to address is done by multiplying by 4096.

LogicalTexturePage. This register holds the logical page for the texture data and is returned back to the Texture Read Unit in bits 0 . . . 15 of the first entry written to the Texture Input FIFO (the FIFO is 128 bits wide) as a header preceding the actual texture data. (All 32 bits of the register are returned in bits 0 . . . 31 to allow for future capabilities.) In a multi-RX system all the RXs take the texture download and not just the RX which requested it.

TextureOperation. This register holds the following information:

| Bit No. | Name | Description |
|---------|------|-------------|
| 0–8 | Length | Transfer length in multiples of 128 bit words, maximum being 256 |
| 9–10 | Memory Pool | Identifies which memory pool the physical page is to be allocated from. |
| 11 | HostVirtual Address | This bit, when set, indicates the address is a host virtual address so the data cannot be read directly without software intervention. The TextureDownload interrupt is generated, if enabled. |

This data (and bits 12–31) are returned back to the Texture Read Unit in bits 32–64 of the first entry written to the Texture Input FIFO (the FIFO is 128 bits wide) as a header preceding the actual texture data.

Gamma broadcasts the LogialTextureAddress and TextureOperation words to the TextureInput FIFO before the actual texture data. The Texture Read Unit on seeing this information will remove any TextureDownloadRequest this transfer will satisfy and allocate space in its texture working set for the new texture page.

The three PCI registers need to be offset from their base address based on the RX number.

If the texture download request results in a TextureDownload interrupt being generated the TextureAddr PCI register is loaded with the virtual address and the TextureOperation PCI register is loaded with the TextureOperation data read from Texture Read Unit before the interrupt is generated. The host services the interrupt, reads these two registers and provides the data. When the data is available in memory the physical address where the data is located is written in to the TextureAddr PCI register. This will wake up the texture download DMA controller and it will do the download.

P3 Texture Downloads Behind a Gamma

The P3 DMA controllers would not work behind the initial version of the Gamma (geometry processor from 3Dlabs), due to PCI bugs in Gamma. All is not lost as the texture management can still be done, but now the driver (or interrupt service routine) needs to do more work.

The Texture DMA controller is placed in SlaveTextureDownload mode (controlled by a bit in a PCI register). This will allow the host to take over some of the DMA Controllers functions.

Each logical texture page is marked as being a Virtual Host Page. When a page fault is taken an interrupt will be generated and the host does the following actions:

1. The host will service and clear this interrupt and read the regHostTextureAddr, regLogicalTexturePage and regTextureOperation registers.
3. The host will write the regLogicalTexturePage into the Texture Input FIFO.
4. The host will write the regTextureOperation into the Texture Input FIFO.
5. The host will write 0 into the Texture Input FIFO (to pad out to 128 bits).
6. The host will write 0 into the Texture Input FIFO (to pad out to 128 bits).
7. The host will download the texture data to the Texture Input FIFO using the length field in regTextureOperation to know how much data to download. The regHostTextureAddr register will indicate what texture page caused the page fault.
8. Wait until pciTextureDownloadRequest (visible via a PCI status register) is low. This will confirm that the data has been downloaded and prevents a possible race condition whereby a false new request is assumed before the old one has been removed.
9. The host will write to the regHostTextureAddr register (any data will do) and this will tell the Texture DMA Controller that all the texture data has been transferred.

All FIFO writes must ensure there is enough space for the data to be written. The FIFO is 128 bits wide and the data is first buffered in a register until the 4th word is written at which time all 128 bits are written into the FIFO. The FIFO space is measured in 128 bit words.

Texture DMA Controller

```
void TextureDMAController (void)
{
    // These three registers can also be read and written by the host across
    // the PCI bus.
    uint32      regHostTextureAddr, reqLogicalTexturePage, regTextureOperation;
    uint128     fifoData;
    uint9       length;
    forever
    {
        if (pciTextureDownloadRequest is asserted)
        {
            // Get the texture request info from the Texture Read Unit.
            regHostTextureAddr = pciHostTexturePage << 12;
            regLogicalTexturePage = pciLogicalTexturePage;
            regTextureoperation = pciTextureOperation;
            if (textureOperation.VirtualHostAddress)
            {
                // Host virtual address. Just raise an interrupt and wait for
                // the host to kick of the DMA.
                SetInterrupt (eTextureDownload);
                // Host responds when it is ready by writing to the
                // regHostTextureAddr when it is ready.
                while (no write to regHostTextureAddr)
```

Texture DMA Controller

```
                ;          // wait
            // Now regHostTextureAddr holds the physical addr supplied by
            // host;
        }
        // SlaveTextureDownload is a bit in a general PCI register.
        if (SlaveTextureDownload == 0)
        {
            bits O . . . 31 of fifoData = regLogicalTexturePage;
            bits 32 . . . 63 of fifoData = regTextureOperation;
            bits 64 . . . 127 of fifoData = 0;
            WriteTextureFIFO (fifoData);
            // Wait for the texture request to be removed before sending
            // texture data.
            while (pciTextureDownloadRequest is asserted)
                ;          // wait.
            // Transfer the data.
            length = bits 0 . . . 8 of regTextureOperation;
            while (length > 0 && pciCommandMode.TextureDownloadEnalbe)
            {
                bits 0 . . . 31 of fifoData = ReadAddr (regHostTextureAddr + 0);
                bits 32 . . . 63 of fifoData = ReadAddr (regHostTextureAddr + 4);
                bits 64 . . . 95 of fifoData = ReadAddr (regHostTextureAddr + 8);
                bits 96 . . . 127 of fifoData = ReadAddr (regHostTextureAddr + 12);
                WriteTextureFIFO (fifoData);
                length- -;
                regHostTextureAddr += 16;        // byte address
            }
        }
    }
}
void WriteTextureFIFO (int128 data)
{
    Wait for room in the Texture Input FIFO;
    Write data into Texture Input FIFO;
}
uint32 ReadAddr (uint32 byteAddr)
{
    return 32 bits of data read from byteAddr;
}
```

RX Texture DMA Controller

```
void TextureDMAController (void)
{
    // These three registers can also be read and written by the host across
    // the PCI bus.
    uint32      regHostTextureAddr, regLogicalTexturePage, 'regTextureOperation;
    uint32      data;
    uint9       length;
    int3        i = 0;
    int         kRXCount;       // Holds the number of RX in the system
    forever
    {
        if (pciTextureDownloadRequest[i] is asserted)
        {
            // Get the texture request info from the Texture Read Unit.
            regHostTextureAddr = ReadTextureInfo (i, 0) << 12;
            regLogicalTexturePage = ReadTextureInfo (i, 1);
            regTextureOperation = ReadTextureInfo (i, 2);
            if (textureOperation.VirtualHostAddress)
            {
                // Host virtual address. Just raise an interrupt and wait for
                // the host to kick of the DMA.
                SetInterrupt (eTextureDownload);
                // Host responds when it is ready by writing to the
                // regHostTextureAddr when it is ready.
                while (no write to regHostTextureAddr)
                    ;          // wait
                // Now regHostTextureAddr holds the physical addr supplied by
                // host;
            }
```

| RX Texture DMA Controller |
|---|

```
            bits 0 . . . 31 of fifoData = regLogicalTexturePage;
            bits 32 . . . 63 of fifoData = regTextureOperation;
            bits 64 . . . 127 of fifoData = 0;
            WriteTextureFIFO (fifoData);
            // Wait for the texture reguest to be removed before sending
            // texture data.
            while (pciTextureDownloadRequest[i] is asserted)
                ;           // wait.
            // Transfer the data.
            length = bits 0 . . . 8 of regTextureOperation;
            while (length > 0 && pciCommandMode.TextureDownloadEnalbe)
            {
                fifoData = ReadAddr (regHostTextureAddr + 0);
                WriteTextureFIFO (aata);
                fifoData = ReadAddr (regHostTextureAddr + 4);
                WriteTextureFIFO (aata);
                fifoData = ReadAddr (regHostTextureAddr + 8);
                WriteTextureFIFO (aata);
                fifoData = ReadAddr (regHostTextureAddr + 12);
                WriteTextureFIFO (aata);
                length- -;
                regHostTextureAddr += 16;              // byte address
            }
        }
        // Round robbin to the next RX.
        i++;
        if (i == kRXCount)
            i = 0;
    }
}
uint32 ReadAddr (uint32 byteAddr)
{
    return 32 bits of data read from byteAddr;
}
// Reading the TextureFIFO returns the info (saves on address decode and
// registers. Note this register is overloaded onto the XXX register.
int32 ReadRXTextureInfo (int3 rxID, int2 register)
{
    int32 addr, data;
    addr = pciRXTextureBase + rxID * 12 + register * 4;    // byte addr.
    data = PCI read on the secondary pci bus to addr;
    return data;
}
void WriteTextureFIFO (int32 data)
    {
    int3    i;
    int32   addr;
        for (i = 0; i < kRXCount; i++)
        {
            while (TextureInputFIFOFull[i] is asserted)
                ;        // wait until it goes empty.
        }
        // Increment the address to allow PCI bust writes.
        addr = pciRXTextureFIFOBase + textureDownloadOffset * 4;
        Write data to addr on the secondary PCI bus;
        textureDownloadoffset++;         // wraps for modulo indexing
}
```

General Control

This unit is controlled by the TextureReadMode0 and TextureReadMode1 messages. These have identical fields (although some fields are ignored in TextureReadMode1). Not all combinations of modes across both registers are supported and where there is a clash the modes in TextureReadMode0 take priority. For per pixel mip mapping the TextureRead0 and TextureReadMode1 register should be set up the same as should the TextureMapWidth0 and TextureMapWidth1 registers.

| BitNo | Name | Description |
|---|---|---|
| 0 | Enable | When set causes any texels needed by the fragment, but not in the primary cache to be read. This is also qualified by the TextureEnable bit in the PrepareToRender message. |

-continued

| BitNo | Name | Description |
|---|---|---|
| 1–4 | Width | This field holds the width of the map as a power of two. The legal range of values for this field is 0 (map width = 1) to 11 (map width 2048). This is only used when Texture3D is enabled and then is only used for cache management purposes and not for address calculations.<br>Note this field is ignored in TextureReadModel. |
| 5–8 | Height | This field holds the height of the map as a power of two. The legal range of values for this field is 0 (map height = 1) to 11 (map height = 2048). This is only used when Texture3D is enabled and then is only used for cache management purposes and not for address calculations.<br>Note field bit is ignored in TextureReadModel. |
| 9–10 | TexelSize | This field holds the size of the texels in the texture map. The options are:<br>0 = 8 bits<br>1 = 16 bits<br>2 = 32 bits<br>3 = 64 bits (Only valid for spans) |
| 11 | Texture3D | This bit, when set, enables 3D texture index generation.<br>Note this bit is ignored in TextureReadModel. The CombinedCache mode bit should not be set when 3D textures are being used. |
| 12 | Combine Cache | This bit, when set, causes the two banks of the Primary Cache to be joined together, thereby increasing the size of a single texture map which can be efficiently handled.<br>Note this bit is ignored in TextureReadModel |
| 13–16 | MapBase Level | This field defines which TextureBaseAddr register should be used to hold the address for map level 0 when mip mapping or the texture map when not mip mapping. Successive map levels are at increasing TextureBaseAddr registers upto (and including) the MaxMaxLevel (next field).<br>3D textures always use TextureBaseAddr0. |
| 17–20 | MapMax Level | This field defines the maximum TextureBaseAddr register this texture should use when mip mapping. Any attempt to use beyond this level will clamp to this level. |
| 21 | LogicalTexture | This bit, when set, defines this texture or all mip map levels, if mip mapping, to be logically mapped so undergo logical to physical translation of the texture addresses. |
| 22 | Origin | This field selects where the origin is for a texture map with a Linear or Patch64 layout.<br>The options are:<br>0 = Top Left.<br>1 = Bottom Left<br>A Patch32 2 or Patch2 texture map is always bottom left origin. |
| 23–24 | Texture Type | This field defines any special processing needed on the texel data before it can be used.<br>The options are:<br>0 = Normal.<br>1 = Eight bit indexed texture.<br>2 = Sixteen bit YVYU texture in 422 format.<br>3 = Sixteen bit VYUY texture in 422 format. |
| 25–27 | ByteSwap | This field defines the byte swapping, if any, to be done on texel data when it is used as a bitmap. This is automatically done when spans are used. Bit 27, when set, causes adjacent bytes to be swapped, bit 26 adjacent 16 bit words to be swapped and bit 27 adjacent 32 bit words to be swapped. In combination this byte swap the input (ABCDEFGH) as follows:<br>0 ABCDEFGH<br>1 BADCFEHG<br>2 CDABGHEF<br>3 ABCDEFGH<br>4 EFGHABCD<br>5 FEHGBADC<br>6 GHEFCDAB<br>7 HGFEDCBA |
| 28 | Mirror | This bit, when set will mirror any bitmap data. This only works for spans. |
| 29 | Invert | This bit, when set will invert any bitmap data. This only works for spans. |
| 30 | Opaque Span | This bit, when set, will cause the SpanColorMask to be modified rather than the pixel mask in SpanStepX or SpanStepYDom messages. |

The TextureCacheReplacementMode register controls the replacement policy in the primary cache. It has the following fields:

| Bit No | Name | Description |
|---|---|---|
| 0 | Keep Oldest0 | This bit, when set, will keep the oldest texels on the scanline when the cache bank 0 is about to wrap and just re-use a set of scratch lines. |

-continued

| Bit No | Name | Description |
|---|---|---|
| 1–5 | Scratch Lines0 | This field holds the number of cache lines to use as scratch lines when the cache bank 0 wraps and the KeepOldest mode bit is set. The value in this field has a MIN_SCRATCH_SIZE value (currently 8) added to it so we can guarantee the scratch line size can always accommodate the cache lines the current fragments requires with some left over. Failure to make this provision would lead to deadlock. |
| 6 | Keep Oldest1 | This bit, when set, will keep the oldest texels on the scanline when the cache bank 1 is about to wrap and just re-use a set of scratch lines. |
| 7–11 | Scratch Lines1 | This field holds the number of cache lines to use as scratch lines when the cache bank 1 wraps and the KeepOldest mode bit is set. The value in this field has a MIN_SCRATCH_SIZE value (currently 8) added to it so we can guarantee the scratch line size can always accommodate the cache lines the current fragments requires with some left over. Failure to make this provision would lead to deadlock. |
| 12 | Show Cach Info | This bit, when set, will cause the fragments color to be replaced by information relating to the cache's performance. The red component shows the number of texture 0 cache line misses The green component shows the number of texture 1 cache line misses. The coding is as follows: 0x40 = 0 misses 0x80 = 1 miss 0xA0 = 2 misses 0xC0 = 3 misses 0xE0 = 4 misses The blue component holds the number of cycles * 8 the fragment was delayed waiting for texel data. The alpha component holds the number of cycles * 8 the primary cache was stalled waiting for a free cache line. |

Sample Computer System Embodiment

FIG. 1 shows a computer incorporating an embodiment of the innovative graphics innovations in a video display adapter 445. The complete computer system includes in this example: user input devices (e.g. keyboard 435 and mouse 440); at least one microprocessor 425 which is operatively connected to receive inputs from the input devices, across e.g. a system bus 431, through an interface manager chip 430 which provides an interface to the various ports and registers; the microprocessor interfaces to the system bus through perhaps a bridge controller 427; a memory (e.g. flash or non-volatile memory 455, RAM 460, and BIOS 453), which is accessible by the microprocessor; a data output device (e.g. display 450 and video display adapter card 445) which is connected to output data generated by the microprocessor 425; and a mass storage disk drive 470 which is read-write accessible, through an interface unit 465, by the microprocessor 425.

Optionally, of course, many other components can be included, and this configuration is not definitive by any means. For example, the computer may also include a CD-ROM drive 480 and floppy disk drive ("FDD") 475 which may interface to the disk interface controller 465. Additionally, L2 cache 485 may be added to speed data access from the disk drives to the microprocessor 425, and a PCMCIA 490 slot accommodates peripheral enhancements. The computer may also accommodate an audio system for multimedia capability comprising a sound card 476 and a speaker(s) 477.

The following background publications provide additional detail regarding details of computer system implementations of the disclosed embodiments, and of modifications and variations thereof. All of these publications are hereby incorporated by reference: Tom Shanley, Pentium Pro Processor System Architecture, Mindshare (1997); James Foley, et alii, Computer Graphics Principles and Practice, Addison-Wesley (1996); Richard Ferraro, Programmer's Guide to the EGA and VGA Cards, Addison-Wesley (1990); Clive Maxfield and Alvin Brown, Bebop Bytes Back, Doone Publications (1997); Pentium II XEON Processor, Intel Corp. (1998); Intel Architecture Software Developer's Manual vols. 1–3, Intel Corp. (1998); P6 Family of Processors Hardware Development Manual, Intel Corp. (1998); AGP Design Guide, Intel Corp. (1998); AGP Pro Specification, Intel Corp. (1998); Jim Chu and Frank Hady, Maximizing AGP Performance, Intel Corp. (1998).

Figure 16:
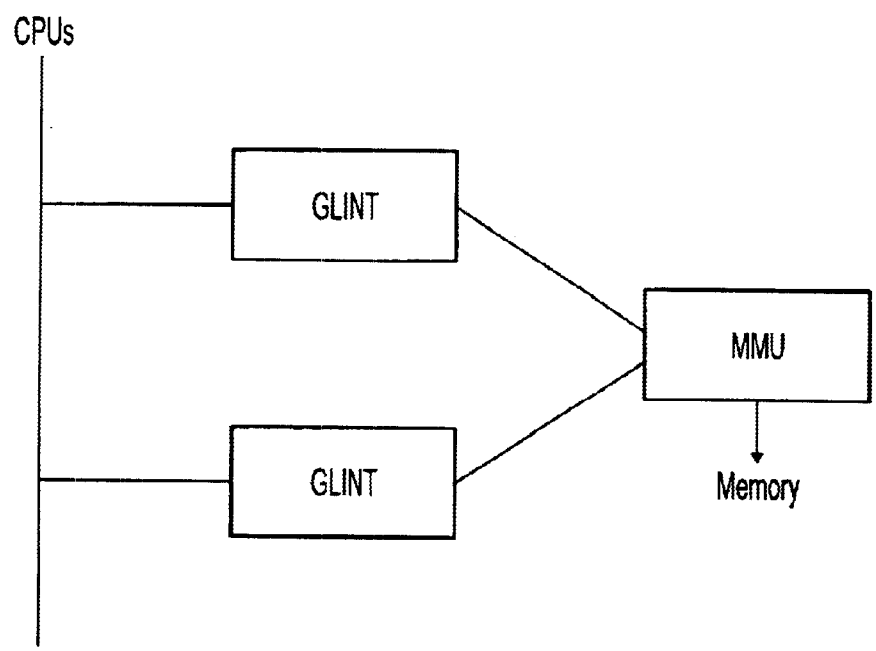
FIG. 16 shows a sample configuration where two rasterizers are served by a common memory manager and bus interface chip.

FIG. 16 shows a sample configuration where two rasterizers are served by a common memory manager and bus interface chip. In the example shown, both chips have a PCI bus connection to the CPUs as well as an arbitrated connection to memory, but of course many other configurations are also possible.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

As noted above, one common feature of many generations of DRAM architectures has been the possibility of improved access speeds for successive accesses to adjacent (or, more generally, nearly adjacent or collocated) physical memory locations. (For example, in static column memories, successive accesses to a single column address provided reduced setup time, and similar principles have been followed in various successive generations of DRAM architecture.) It should be noted that the disclosed inventions are not limited to avoiding page breaks in SDRAM and SGRAM architectures, but are applicable to any memory architecture which includes some granularity of access speed.

For another example, the virtual texture innovations disclosed in the present application can optionally be used in combination with at least some of the previous virtual texture schemes discussed above.

The following background publications provide additional detail regarding possible implementations of the disclosed embodiments, and of modifications and variations thereof, and the predictable results of such modifications: Advances in Computer Graphics (ed. Enderle 1990); Chellappa and Sawchuk, Digital Image Processing and Analysis (1985); Computer Graphics Hardware (ed. Reghbati and Lee 1988); Computer Graphics: Image Synthesis (ed. Joy et al.); Foley et al., Fundamentals of Interactive Computer Graphics (2.ed. 1984); Foley, Computer Graphics Principles & Practice (2.ed. 1990); Foley, Introduction to Computer Graphics (1994); Hearn and Baker, Computer Graphics (2.ed. 1994); Hill, Computer Graphics (1990); Latham, Dictionary of Computer Graphics (1991); Magnenat-Thalma, Image Synthesis Theory & Practice (1988); Prosise, How Computer Graphics Work (1994); Rimmer, Bit Mapped Graphics (2.ed. 1993); Salmon, Computer Graphics Systems & Concepts (1987); Schachter, Computer Image Generation (1990); Watt, Three-Dimensional Computer Graphics (2.ed. 1994, 3.ed. 2000); Scott Whitman, Multiprocessor Methods For Computer Graphics Rendering; David S. Ebert et al., Texturing and Modeling; Tomas Moller and Eric Haines, Real-Time Rendering; Michael O'Rourke, Principles of Three-Dimensional Computer Animation; Blinn, Jim Blinn's Corner: Dirty Pixels; Blinn, Jim Blinn's Corner: A Trip Down the Graphics Pipeline; Watt and Watt, Advanced Animation and Rendering Techniques: Theory and Practice; the SIGGRAPH Proceedings for the years 1980-to date; and the IEEE Computer Graphics and Applications magazine for the years 1990-to date; all of which are hereby incorporated by reference.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A graphics processing method, comprising the steps of:
   using virtual memory management for graphics data, including textures, and when a graphics operation is being performed which accesses data related to at least two separate localities,
   remapping data accesses for said separate localities onto respective separate pools of physical memory,
   wherein said pools each optimize the likelihood of rapid successive access to collocated bits of said physical memory.

2. The method of claim 1, wherein said localities are textures.

3. The method of claim 1, wherein said physical memory is SDRAM, and said pools avoid page breaks.

4. The method of claim 1, wherein said graphics process is mipmapping.

5. The method of claim 1, wherein said graphics process accesses adjacent slices of a 3D volume.

6. A graphics processing method, comprising the steps of:
   using virtual memory management for graphics data, including textures, and when a graphics operation is being performed which accesses at least two separate textures,
   remapping data accesses for said textures onto respective separate pools of physical memory,
   wherein said pools each optimize the likelihood of rapid successive access to collocated bits of said physical memory.

7. The method of claim 6, wherein accesses for depth data are remapped onto a third pool of said physical memory.

8. The method of claim 6, wherein accesses for depth data are remapped onto a third pool of said physical memory, and accesses for color data are remapped onto a fourth pool of said physical memory.

9. The method of claim 6, wherein accesses for color data are remapped onto an additional pool of said physical memory.

10. The method of claim 6, wherein said graphics process is mipmapping.

11. The method of claim 6, wherein said graphics process accesses adjacent slices of a 3D volume.

12. A computer system, comprising:
    a graphics accelerator which includes a dedicated virtual memory manager which manages at least some host memory as well as dedicated graphics memory, and which manages memory, during at least one graphics process which uses two independent localities, using at least two separate pools of physical memory for accesses to said two localities;
    wherein said pools each optimize the likelihood of rapid successive access to collocated bits of said physical memory.

13. The system of claim 12, wherein said physical memory is SDRAM, and said pools avoid page breaks.

14. The system of claim 12, wherein said graphics process is mipmapping.

15. The system of claim 12, wherein said graphics process accesses adjacent slices of a 3D volume.

16. The system of claim 12, wherein said memory manager remaps accesses for depth data onto a third pool of said physical memory.

17. The system of claim 12, wherein said memory manager remaps accesses for depth data onto a third pool of said physical memory, and remaps accesses for color data onto a fourth pool of said physical memory.

18. The system of claim 12, wherein said memory manager remaps accesses for color data onto an additional pool of said physical memory.

19. A graphics subsystem, comprising:
    a 3D rendering accelerator;
    a dedicated virtual memory manager
        which manages at least some host memory as well as dedicated graphics memory,
        and which manages memory, during at least one graphics process which uses two independent localities, using at least two separate pools of physical memory for accesses to said two localities;
    wherein said pools each optimize the likelihood of rapid successive access to collocated bits of said physical memory.

20. The subsystem of claim 19, wherein said physical memory is SDRAM, and said pools avoid page breaks.

21. The subsystem of claim 19, wherein said graphics process is mipmapping.

22. The subsystem of claim 19, wherein said graphics process accesses adjacent slices of a 3D volume.

* * * * *